US012294273B2

(12) United States Patent
Ikezoe et al.

(10) Patent No.: US 12,294,273 B2
(45) Date of Patent: May 6, 2025

(54) VIBRATION GENERATING DEVICE

(71) Applicant: ALPS ALPINE CO., LTD., Tokyo (JP)

(72) Inventors: Yuki Ikezoe, Miyagi (JP); Takenori Takahashi, Miyagi (JP); Kazunari Takahashi, Miyagi (JP)

(73) Assignee: ALPS ALPINE CO., LTD., Tokyo (JP)

( * ) Notice: Subject to any disclaimer, the term of this patent is extended or adjusted under 35 U.S.C. 154(b) by 251 days.

(21) Appl. No.: 18/314,282

(22) Filed: May 9, 2023

(65) Prior Publication Data

US 2023/0275498 A1 Aug. 31, 2023

Related U.S. Application Data

(63) Continuation of application No. PCT/JP2021/043416, filed on Nov. 26, 2021.

(30) Foreign Application Priority Data

Dec. 25, 2020 (JP) ................................. 2020-217437

(51) Int. Cl.
*H02K 33/18* (2006.01)
(52) U.S. Cl.
CPC .................................... *H02K 33/18* (2013.01)
(58) Field of Classification Search
CPC ........ H02K 35/00; H02K 35/02; H02K 35/04; H02K 35/06; H02K 33/18; H02K 33/00; H02K 33/02; H02K 33/16

(Continued)

(56) References Cited

U.S. PATENT DOCUMENTS 4,346,318 A * 8/1982 Shtrikman ............. H02K 33/06
310/12.24
4,831,292 A * 5/1989 Berry ..................... H02K 33/06
310/23

(Continued)

FOREIGN PATENT DOCUMENTS

JP 2004-138009 5/2004
JP 2013-118332 6/2013

(Continued)

OTHER PUBLICATIONS

International Search Report for PCT/JP2021/043416 mailed on Jan. 11, 2022.

*Primary Examiner* — Maged M Almawri
(74) *Attorney, Agent, or Firm* — IPUSA, PLLC

(57) ABSTRACT

A vibration generating device includes a coil and a magnetic flux source. The magnetic flux source includes a left-hand magnet, a first middle magnet, a second middle magnet, and a right-hand magnet. The coil includes a left-hand coil and a right-hand coil. The left-hand coil and the right-hand coil each include a left-hand wire bundle and a right-hand wire bundle. Magnetic fluxes from the middle magnet passing through, in an up-and-down direction, a space between the right-hand wire bundle of the left-hand coil and the first middle magnet are less than magnetic fluxes from the left-hand magnet that pass through, in the up-and-down direction, a space between the left-hand wire bundle of the left-hand coil and the left-hand magnet.

4 Claims, 28 Drawing Sheets

(58) Field of Classification Search
USPC ......... 310/15–29, 12, 4, 81, 80, 321, 28–30,
310/36–37, 40 MM
See application file for complete search history.

(56) References Cited

U.S. PATENT DOCUMENTS

| | | | | |
|---|---|---|---|---|
| 5,587,615 A * | 12/1996 | Murray | ................. | H02K 33/16 310/15 |
| 6,091,167 A * | 7/2000 | Vu | ................. | H01F 7/066 310/12.01 |
| 6,914,351 B2 * | 7/2005 | Chertok | ................. | H02K 35/02 310/12.26 |
| 7,633,189 B2 * | 12/2009 | Iwasa | ................. | H02K 41/03 310/15 |
| 7,656,062 B2 * | 2/2010 | Binnard | ................. | H02N 15/00 310/12.05 |
| 7,671,493 B2 * | 3/2010 | Takashima | ................. | G06F 3/016 310/15 |
| 7,687,943 B2 * | 3/2010 | Lunde | ................. | H02K 7/1846 310/58 |
| 8,278,786 B2 * | 10/2012 | Woo | ................. | H02K 33/16 310/15 |
| 8,358,039 B2 * | 1/2013 | Trumper | ................. | G01Q 10/04 310/12.24 |
| 8,456,032 B2 * | 6/2013 | Hochberg | ................. | F03B 13/00 290/43 |
| 8,648,502 B2 * | 2/2014 | Park | ................. | H02K 33/16 310/15 |
| 8,704,387 B2 * | 4/2014 | Lemieux | ................. | F03G 7/08 290/1 R |
| 8,941,251 B2 * | 1/2015 | Zuo | ................. | H02K 35/02 290/1 R |
| 9,024,489 B2 * | 5/2015 | Akanuma | ................. | H02K 33/16 310/15 |
| 9,225,265 B2 * | 12/2015 | Oh | ................. | G06F 3/016 |
| 9,240,267 B2 * | 1/2016 | Nagahara | ................. | H02K 35/02 |
| 9,306,429 B2 * | 4/2016 | Akanuma | ................. | H02K 33/16 |
| 9,543,816 B2 * | 1/2017 | Nakamura | ................. | H02K 33/16 |
| 9,748,827 B2 * | 8/2017 | Dong | ................. | H02K 33/16 |
| 9,948,170 B2 * | 4/2018 | Jun | ................. | H02K 33/00 |
| 10,033,257 B2 * | 7/2018 | Zhang | ................. | H02K 33/12 |
| 10,063,128 B2 * | 8/2018 | Wang | ................. | H02K 33/16 |
| 10,160,010 B2 * | 12/2018 | Chun | ................. | H02K 33/16 |
| 10,307,791 B2 * | 6/2019 | Xu | ................. | B06B 1/045 |
| 10,328,461 B2 * | 6/2019 | Xu | ................. | B06B 1/045 |
| 10,404,150 B2 * | 9/2019 | Swanson | ................. | H02K 35/06 |
| 10,447,133 B2 * | 10/2019 | Jin | ................. | H02K 33/18 |
| 10,483,451 B2 * | 11/2019 | Wang | ................. | H10N 30/01 |
| 10,486,196 B2 * | 11/2019 | Chai | ................. | B06B 1/045 |
| 10,491,090 B2 * | 11/2019 | Zu | ................. | H02K 33/16 |
| 10,581,355 B1 * | 3/2020 | Dyson | ................. | H02P 6/005 |
| 10,596,596 B2 * | 3/2020 | Ling | ................. | B06B 1/045 |
| 10,674,278 B2 * | 6/2020 | Zhou | ................. | H04R 9/025 |
| 10,763,732 B2 * | 9/2020 | Liu | ................. | H02K 33/18 |
| 10,886,827 B2 * | 1/2021 | Liu | ................. | H02K 33/14 |
| 10,930,838 B1 * | 2/2021 | Miesner | ................. | H02N 2/043 |
| 10,998,487 B1 * | 5/2021 | Miesner | ................. | H10N 35/80 |
| 11,050,334 B2 * | 6/2021 | Mori | ................. | H02K 33/16 |
| 11,522,429 B2 * | 12/2022 | Takahashi | ................. | H02K 33/06 |
| 11,652,395 B1 * | 5/2023 | Miesner | ................. | H02K 41/0356 310/12.16 |
| 2003/0127916 A1 * | 7/2003 | Godkin | ................. | H02K 41/0356 310/12.16 |
| 2006/0044093 A1 * | 3/2006 | Ohta | ................. | H02K 99/20 335/220 |
| 2008/0174187 A1 * | 7/2008 | Erixon | ................. | H02K 33/16 310/15 |
| 2009/0267423 A1 * | 10/2009 | Kajiwara | ................. | H02K 33/02 310/38 |
| 2010/0213773 A1 * | 8/2010 | Dong | ................. | H02K 33/16 310/25 |
| 2010/0308675 A1 * | 12/2010 | Thundat | ................. | H02K 21/12 310/152 |
| 2010/0314953 A1 * | 12/2010 | Gan | ................. | H02K 15/125 310/12.16 |
| 2011/0018364 A1 * | 1/2011 | Kim | ................. | H02K 33/18 310/20 |
| 2011/0068640 A1 * | 3/2011 | Choi | ................. | H02K 5/04 310/25 |
| 2011/0089772 A1 * | 4/2011 | Dong | ................. | H02K 33/16 310/25 |
| 2011/0115311 A1 * | 5/2011 | Dong | ................. | H02K 33/16 310/28 |
| 2011/0133488 A1 * | 6/2011 | Roberts | ................. | H02K 35/02 322/3 |
| 2011/0133577 A1 * | 6/2011 | Lee | ................. | H02K 33/18 310/15 |
| 2011/0266892 A1 * | 11/2011 | Wauke | ................. | H02K 33/18 310/25 |
| 2012/0153748 A1 * | 6/2012 | Wauke | ................. | H02K 33/16 310/25 |
| 2012/0187780 A1 * | 7/2012 | Bang | ................. | H02K 33/16 310/25 |
| 2012/0242086 A1 * | 9/2012 | Yang | ................. | H02K 35/02 290/50 |
| 2012/0242175 A1 * | 9/2012 | Yang | ................. | H02K 35/02 310/30 |
| 2012/0313459 A1 * | 12/2012 | Zhang | ................. | H02K 33/18 310/25 |
| 2013/0093266 A1 * | 4/2013 | Hong | ................. | H02K 33/18 29/446 |
| 2013/0099600 A1 * | 4/2013 | Park | ................. | B06B 1/045 310/15 |
| 2013/0169071 A1 * | 7/2013 | Endo | ................. | H02K 33/12 310/25 |
| 2014/0054983 A1 * | 2/2014 | Moon | ................. | H02K 33/16 310/28 |
| 2014/0062224 A1 * | 3/2014 | Kim | ................. | H02K 33/16 310/15 |
| 2014/0346901 A1 * | 11/2014 | Hayward | ................. | H02K 15/14 310/25 |
| 2015/0234297 A1 * | 8/2015 | Akkermans | ................. | G03F 7/22 318/135 |
| 2016/0173990 A1 * | 6/2016 | Park | ................. | H04R 9/043 381/354 |
| 2017/0033657 A1 * | 2/2017 | Mao | ................. | H02K 33/16 |
| 2017/0110920 A1 * | 4/2017 | Mao | ................. | H02K 1/34 |
| 2017/0288519 A1 * | 10/2017 | Kim | ................. | H02K 33/16 |
| 2018/0021812 A1 * | 1/2018 | Akanuma | ................. | H02K 33/00 310/25 |
| 2019/0044425 A1 * | 2/2019 | Zu | ................. | H02K 33/02 |
| 2020/0044538 A1 * | 2/2020 | Tang | ................. | H02K 33/18 |
| 2020/0161954 A1 | 5/2020 | Tsuchihashi et al. | | |
| 2020/0212786 A1 * | 7/2020 | Ling | ................. | H02K 33/18 |
| 2020/0358347 A1 | 11/2020 | Nakamura et al. | | |
| 2020/0412221 A1 * | 12/2020 | Yan | ................. | H02K 33/16 |
| 2020/0412226 A1 * | 12/2020 | Ma | ................. | H02K 33/16 |
| 2020/0412228 A1 * | 12/2020 | Mao | ................. | H02K 33/18 |
| 2021/0075306 A1 * | 3/2021 | Little | ................. | H02K 33/02 |
| 2022/0255412 A1 * | 8/2022 | Wang | ................. | H02K 33/16 |

FOREIGN PATENT DOCUMENTS

JP 2019-013096 1/2019
WO 2019/151232 8/2019

* cited by examiner

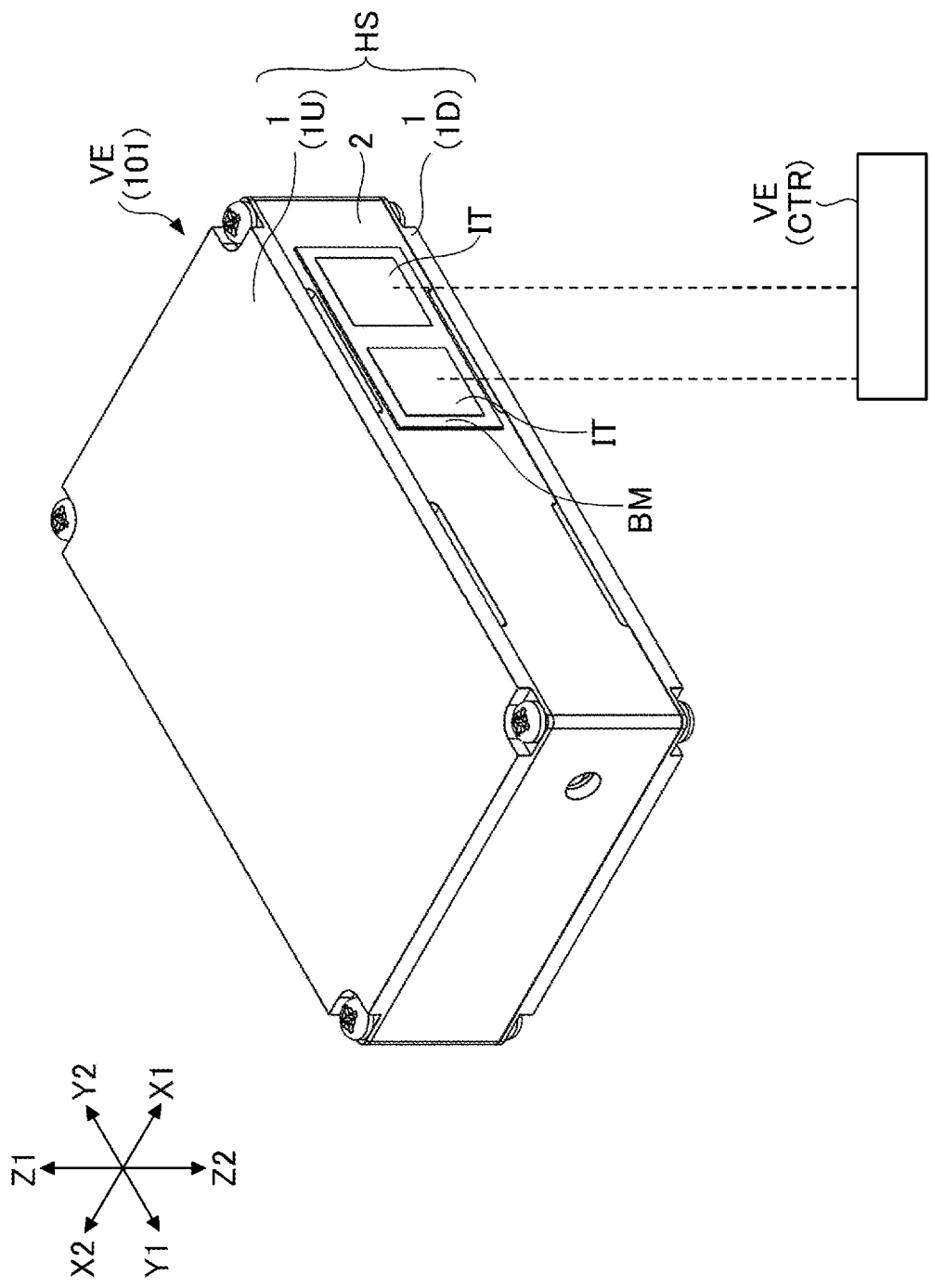

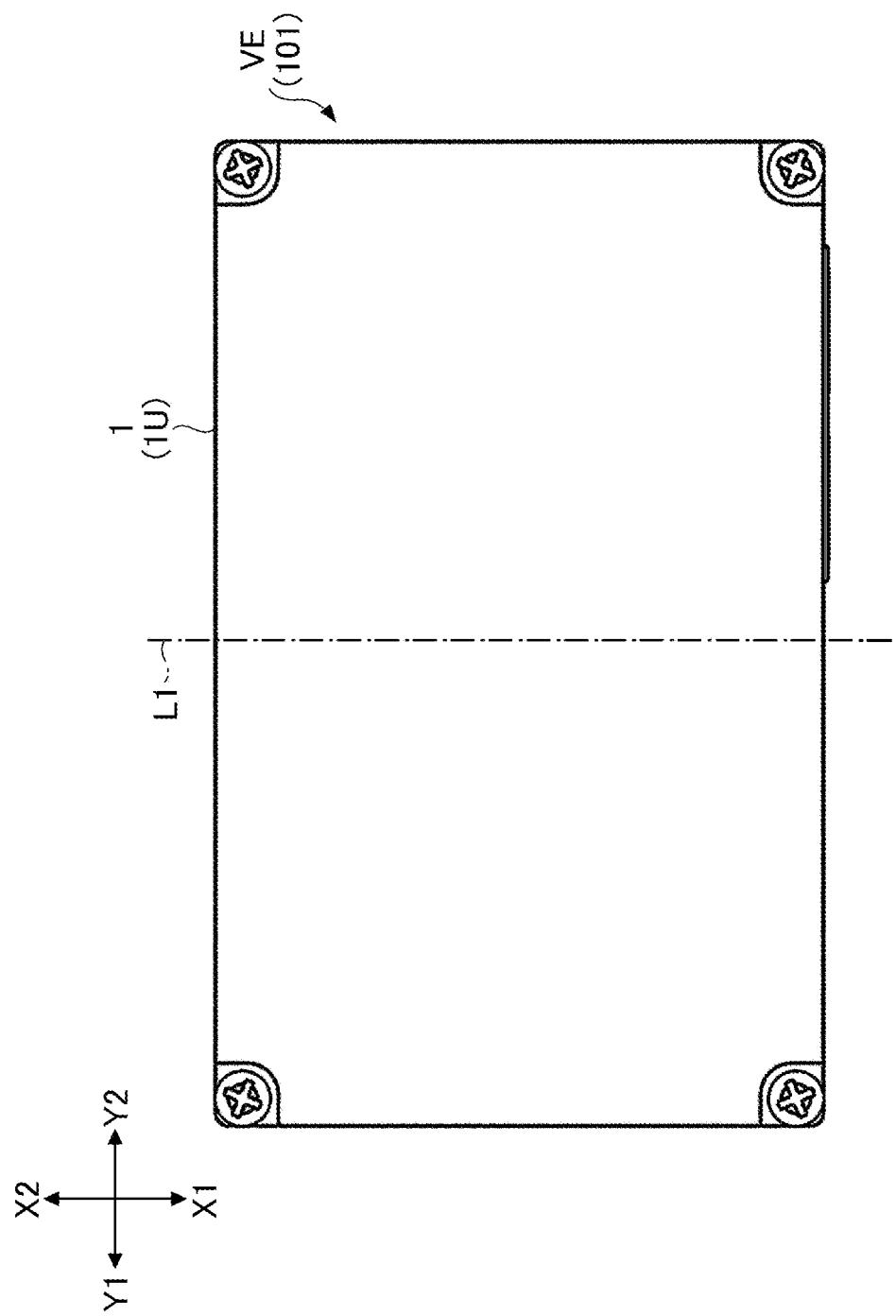

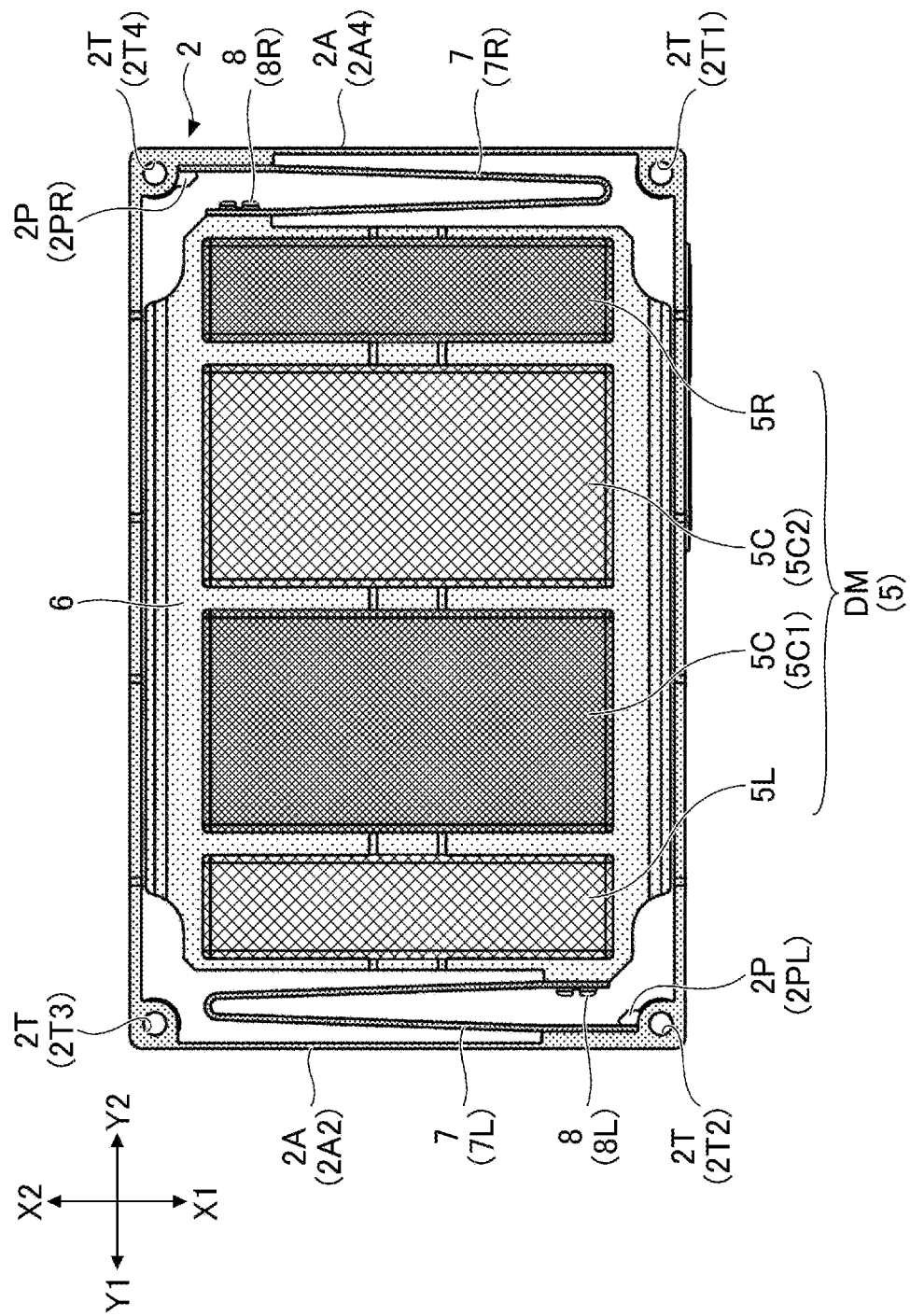

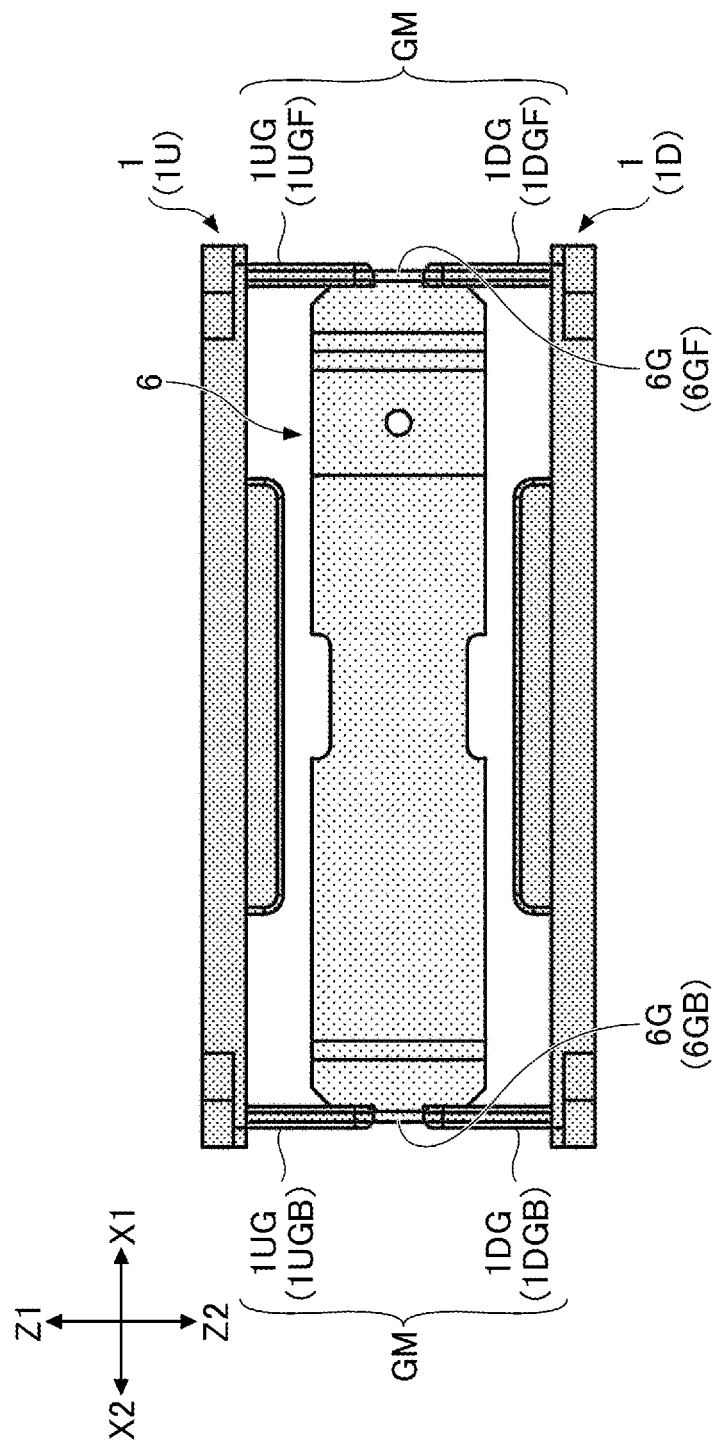

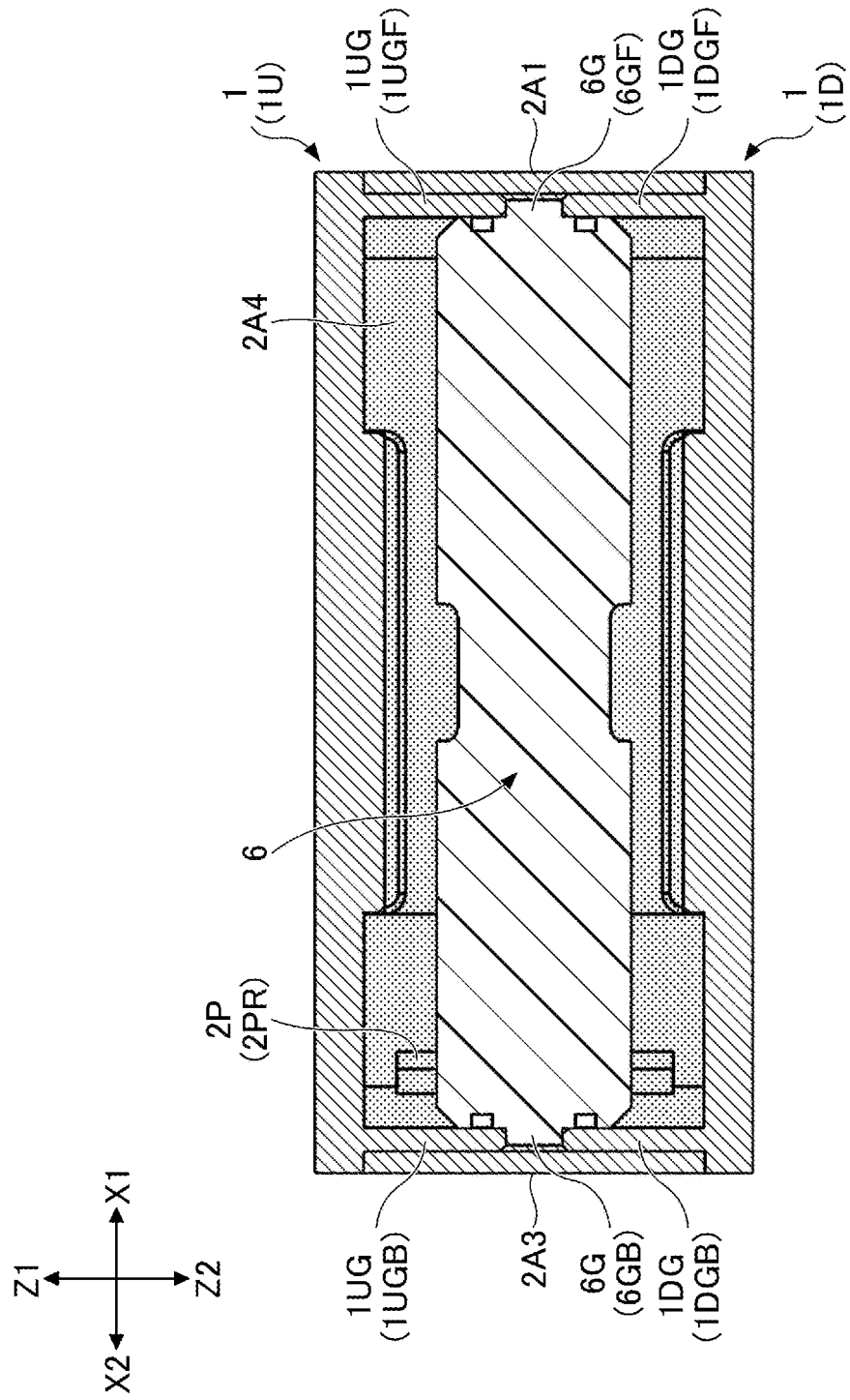

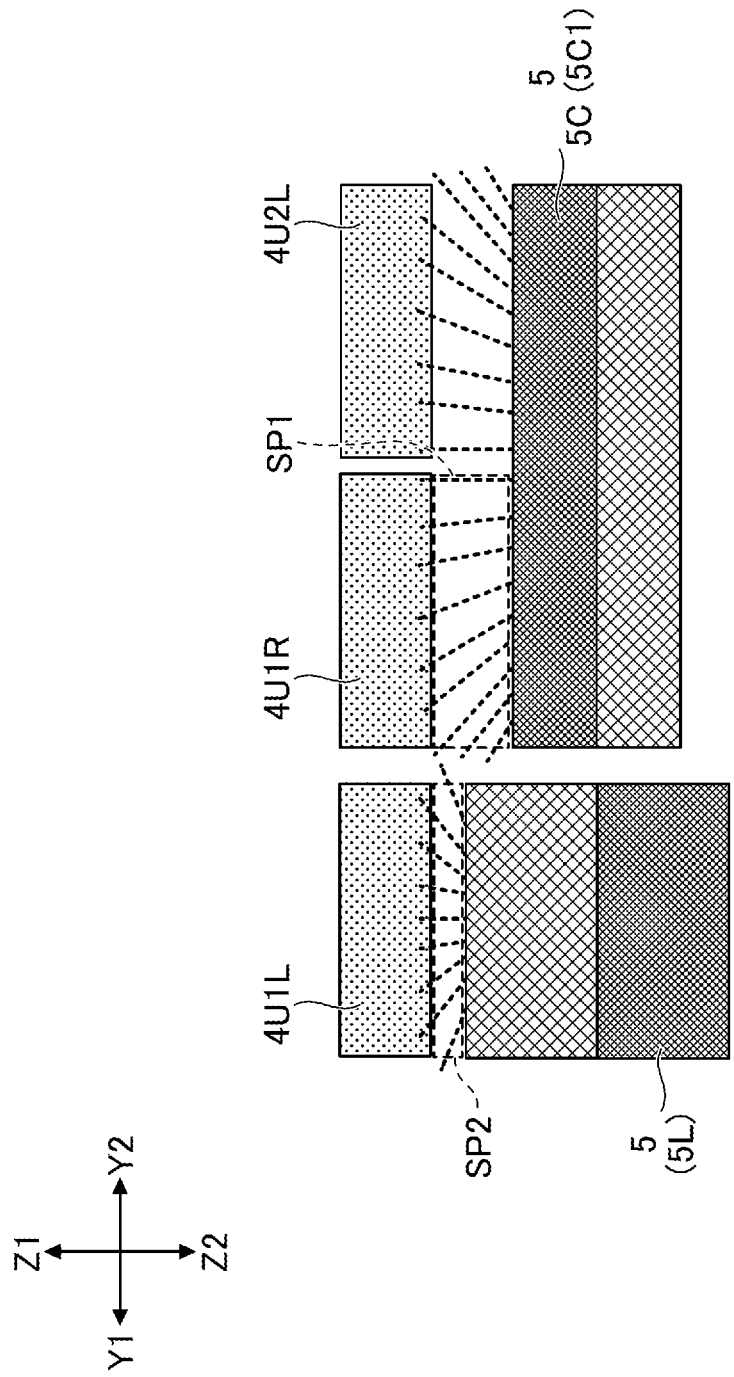

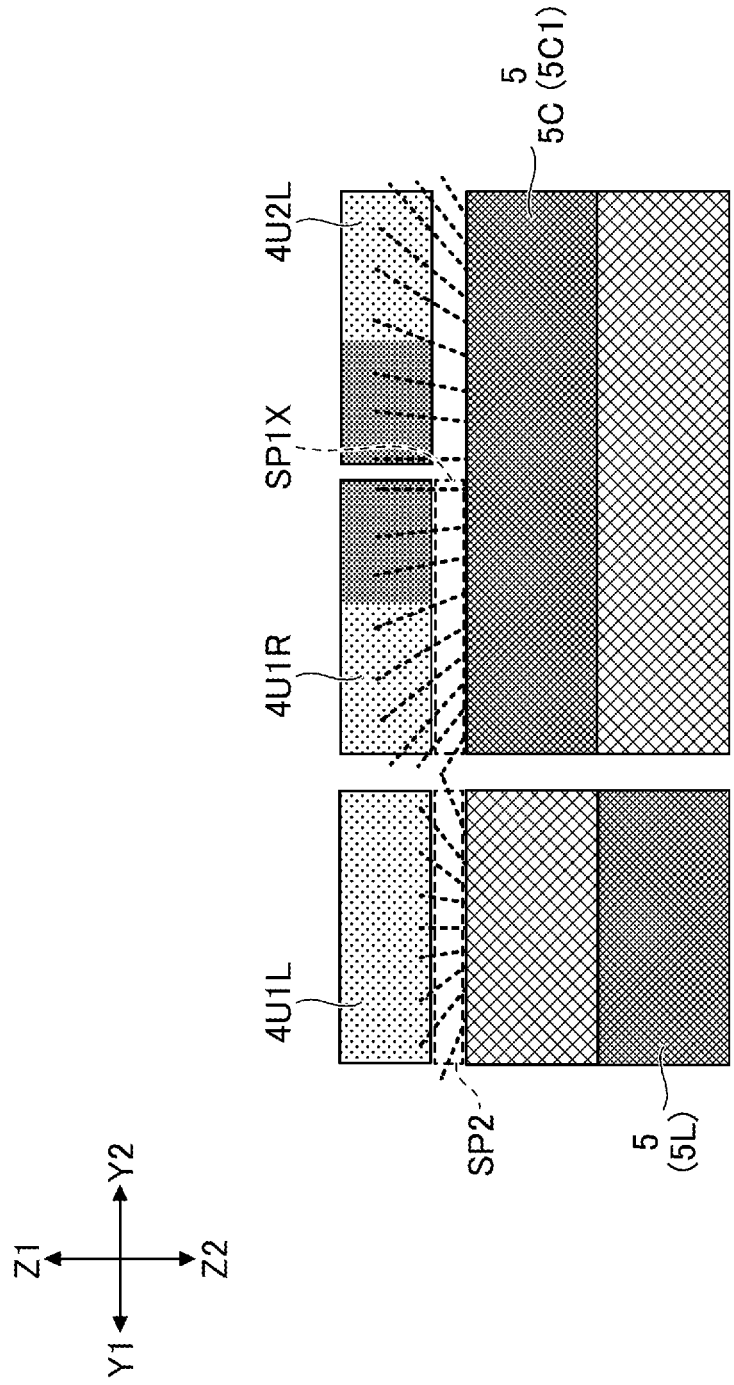

VIBRATION GENERATING DEVICE

CROSS-REFERENCE TO RELATED APPLICATION

This application is a continuation application of International Application No. PCT/JP2021/043416 filed on Nov. 26, 2021, and designated the U.S., which is based upon and claims priority to Japanese Patent Application No. 2020-217437, filed on Dec. 25, 2020, the entire contents of which are incorporated herein by reference.

BACKGROUND

1. Field of the Invention

The present disclosure relates to a vibration generating device.

2. Description of the Related Art

Conventionally, a linear vibration actuator including a guide portion that holds a movable element (movable body) so that the movable element is reciprocally movable (see Patent Document 1). The guide portion is a member that is housed in a housing and separate from the housing, and includes a pair of rail members. A pair of guide grooves (recessed portions) formed in the pair of rail members are configured to be fitted into a pair of end edges (projected portions) provided at both sides of the movable element. The movable element can reciprocally move along the pair of guide grooves while being guided by the pair of the guide grooves.

Driving of the movable element is realized by six magnets attached to the movable element, and six coils attached to the housing via a coil holder. The six magnets have the same intensity of a magnetic force and are juxtaposed along the direction in which the movable element reciprocally moves. Also, the six coils include three coils disposed above the movable element, and three coils disposed below the movable element.

CITATION LIST

Patent Document

Patent Document 1: International Publication No. WO2019/151232

In the above-described configuration, when the movable body moves in a back-and-forth direction, the intensity of a magnetic field that vertically passes through the coil is changed. As a result, an induced current occurs in a direction to reduce the change in the intensity of the magnetic field, and a driving force (Lorentz force) to move the movable body may decrease.

In view thereof, it is desirable to provide a vibration generating device that can suppress the reduction in the driving force due to the change in the intensity of the magnetic field that passes through the coil.

SUMMARY

A vibration generating device according to an embodiment of the present disclosure includes: a stationary body; a movable body housed in the stationary body; a guide member that is configured to guide the movable body so that the movable body is reciprocally movable in the stationary body along a left-and-right direction; a magnetic flux source that is fixed to one of the movable body and the stationary body and configured to generate a magnetic flux along an up-and-down direction; and a coil that is fixed to the other of the movable body and the stationary body so as to cross the magnetic flux generated by the magnetic flux source and includes electrically conductive wires extending along a front-and-back direction and being juxtaposed along the left-and-right direction. The magnetic flux source includes a left-hand magnet, at least one middle magnet, and a right-hand magnet. The left-hand magnet, the at least one middle magnet, and the right-hand magnet are juxtaposed along the left-and-right direction. The coil includes: a left-hand coil including a left-hand wire bundle that is to cross the magnetic flux from the left-hand magnet and a right-hand wire bundle that is to cross the magnetic flux from the at least one middle magnet; and a right-hand coil including a left-hand wire bundle that is to cross the magnetic flux from the at least one middle magnet and a right-hand wire bundle that is to cross the magnetic flux from the right-hand magnet. Magnetic fluxes generated from the at least one middle magnet that pass through, in the up-and-down direction, a space between the right-hand wire bundle of the left-hand coil and the at least one middle magnet are less than magnetic fluxes generated from the left-hand magnet that pass through, in the up-and-down direction, a space between the left-hand wire bundle of the left-hand coil and the left-hand magnet. Magnetic fluxes generated from the at least one middle magnet that pass through, in the up-and-down direction, a space between the left-hand wire bundle of the right-hand coil and the at least one middle magnet are less than magnetic fluxes generated from the right-hand magnet that pass through, in the up-and-down direction, a space between the right-hand wire bundle of the right-hand coil and the right-hand magnet.

BRIEF DESCRIPTION OF DRAWINGS

FIG. 1A is a perspective view of a vibration generating device.

FIG. 1B is a top plan view of the vibration generating device.

FIG. 4B is a top plan view of the movable body that is attached to a side casing.

FIG. 5B is a detailed view of the members that form the guide member.

FIG. 6B is a cross-sectional view of the vibration generating device.

FIG. 12A is an enlarged view of a left-hand magnet and a first middle magnet.

FIG. 12B is an enlarged view of the left-hand magnet and the first middle magnet.

DESCRIPTION OF THE EMBODIMENTS

Figure 2:
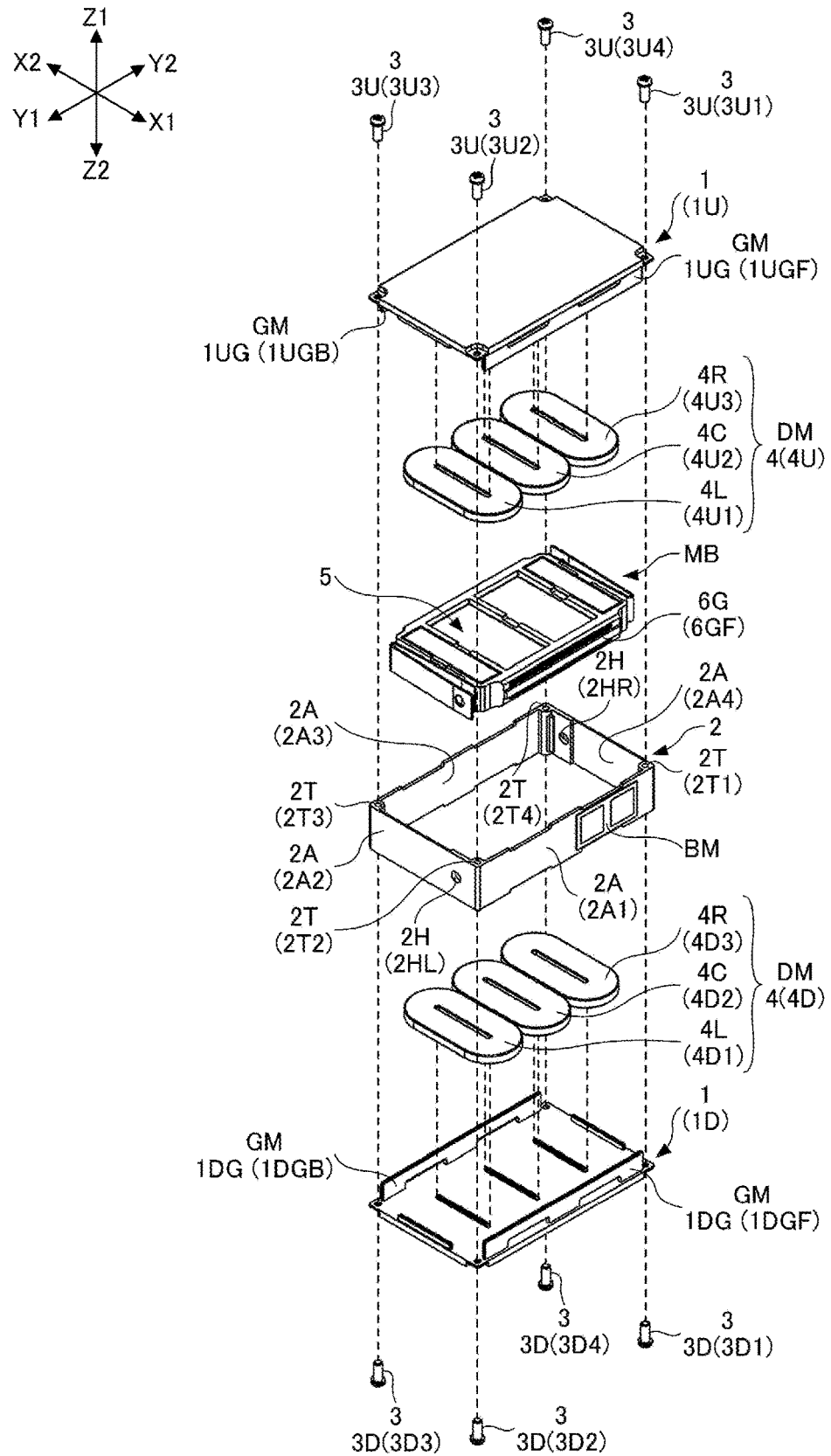
FIG. 2 is an exploded perspective view of the vibration generating device.

Hereinafter, referring to the drawings, a vibration generating device 101 according to an embodiment of the present disclosure will be described. FIG. 1A and FIG. 1B are outline views of the vibration generating device 101. Specifically, FIG. 1A is a perspective view of the vibration generating device 101, and FIG. 1B is a top plan view of the vibration generating device 101. FIG. 2 is an exploded perspective view of the vibration generating device 101.

In each of FIG. 1A, FIG. 1B, and FIG. 2, X1 represents one direction of an X axis that forms a three-dimensional orthogonal coordinate system, and X2 represents the other direction of the X axis. Also, Y1 represents one direction of a Y axis that forms the three-dimensional orthogonal coordinate system, and Y2 represents the other direction of the Y axis. Similarly, Z1 represents one direction of a Z axis that forms the three-dimensional orthogonal coordinate system, and Z2 represents the other direction of the Z axis. In the present embodiment, the X1 side of the vibration generating device 101 corresponds to a front side (front-face side) of the vibration generating device 101, and the X2 side of the vibration generating device 101 corresponds to a back side (back-face side) of the vibration generating device 101. Also, the Y1 side of the vibration generating device 101 corresponds to a left-hand side of the vibration generating device 101, and the Y2 side of the vibration generating device 101 corresponds to a right-hand side of the vibration generating device 101. The Z1 side of the vibration generating device 101 corresponds to a top side of the vibration generating device 101, and the Z2 side of the vibration generating device 101 corresponds to a bottom side of the vibration generating device 101. The same applies to the other drawings.

A vibration device VE includes a controller CTR and the vibration generating device 101. The vibration generating device 101 includes a housing HS as the stationary body, a movable body MB housed in the housing HS, and a coil 4 attached to the housing HS. The controller CTR is connected to input terminals IT provided on an insulating substrate BM fixed to the housing HS. Note that, the dashed lines in FIG. 1A schematically illustrate that the controller CTR is electrically connected to the input terminals IT provided on the insulating substrate BM.

As illustrated in FIG. 1A, the housing HS has a generally cuboid outline and is configured such that the areas of the planes parallel to the XY plane (the top face and the bottom face) are the largest. In the present embodiment, the housing HS is formed of a non-magnetic material such as austenitic stainless steel. However, the housing HS may be formed of a synthetic resin. Alternatively, the housing HS may be formed of a magnetic material. Specifically, the housing HS is formed of a casing 1 and a side casing 2.

As illustrated in FIG. 2, the casing 1 includes an upper casing 1U forming a top face of the housing HS, and a lower casing 1D forming a bottom face of the housing HS. The upper casing 1U and the lower casing 1D are both plate members. In the present embodiment, the upper casing 1U and the lower casing 1D have the same shape and the shape size. In other words, the upper casing 1U and the lower casing 1D are the same parts.

Also, the upper casing 1U is formed so as to be front-back symmetrical and left-right symmetrical. The lower casing 1D is formed in the same way. The upper casing 1U and the lower casing 1D are disposed so as to be top-bottom symmetrical to each other.

The side casing 2 is made to form the side surface of the housing HS. In the present embodiment, the side casing 2 includes four side plates 2A each formed into a flat plate. Specifically, as illustrated in FIG. 2, the side plates 2A have a first side plate 2A1 and a third side plate 2A3 that face each other, and a second side plate 2A2 and a fourth side plate 2A4 that face each other and are vertical to the first side plate 2A1 and the third side plate 2A3, respectively.

The casing 1 is fastened to the side casing 2 with fastening members 3. Specifically, the fastening members 3 have upper fastening members 3U and lower fastening members 3D. In the present embodiment, the fastening members 3 are external screws that can be treated with a Phillips screwdriver, and are configured to engage with internal thread holes 2T formed at the corners of the side casing 2. The internal thread holes 2T, formed at the corners of the side casing 2, are formed so as to penetrate the corners of the side casing 2 along the Z-axis direction. The internal thread holes 2T have a first internal thread hole 2T1 to a fourth internal thread hole 2T4. The upper casing 1U is fastened to the side casing 2 with four upper fastening members 3U (first upper external screw 3U1 to fourth upper external screw 3U4). Specifically, the first upper external screw 3U1 is screwed into an upper opening of the first internal thread hole 2T1 formed at the right-front corner of the side casing 2, the second upper external screw 3U2 is screwed into an upper opening of the second internal thread hole 2T2 formed at the left-front corner of the side casing 2, the third upper external screw 3U3 is screwed into an upper opening of the third internal thread hole 2T3 formed at the left-back corner of the side casing 2, and the fourth upper external screw 3U4 is screwed into an upper opening of the fourth internal thread hole 2T4 formed at the right-back corner of the side casing 2. Similarly, the lower casing 1D is fastened to the side casing 2 with four lower fastening members 3D (first lower external screw 3D1 to fourth lower external screw 3D4). Specifically, the first lower external screw 3D1 is screwed into a lower opening of the first internal thread hole 2T1 formed at the right-front corner of the side casing 2, the second lower external screw 3D2 is screwed into a lower opening of the second internal thread hole 2T2 formed at the left-front corner of the side casing 2, the third lower external screw 3D3 is screwed into a lower opening of the third internal thread hole 2T3 formed at the left-back corner of the side casing 2, and the fourth lower external screw 3D4 is screwed into a lower opening of the fourth internal thread hole 2T4 formed at the right-back corner of the side casing 2.

The coil 4 is a member forming a drive member DM. In the present embodiment, the coil 4 is a wire-wound coil that is formed through winding of an electrically conductive wire coated with an insulating material on the surface thereof, and is fixed to the casing 1. For simplicity, FIG. 2 does not illustrate a detailed wound state of the electrically conductive wire. The same applies to some other drawings that illustrate the coil 4. The coil 4 may be, for example, a layer-stacked coil or a thin-film coil. Specifically, the coil 4 includes an upper coil 4U that is fixed to a lower (Z2-side) face of the upper casing 1U, and a lower coil 4D that is fixed to an upper (Z1-side) face of the lower casing 1D. The upper coil 4U includes a first upper coil 4U1, a second upper coil 4U2, and a third upper coil 4U3 that are juxtaposed along the Y-axis direction and connected together in series. The lower coil 4D includes a first lower coil 4D1, a second lower coil 4D2, and a third lower coil 4D3 that are juxtaposed along the Y-axis direction and connected together in series. Note that, hereinafter, the first upper coil 4U1 and the first lower coil 4D1 will also be referred to as a left-hand coil 4L, the second upper coil 4U2 and the second lower coil 4D2 will also be referred to as a middle coil 4C, and the third upper coil 4U3 and the third lower coil 4D3 will also be referred to as a right-hand coil 4R.

The controller CTR can control movement of the movable body MB. In the present embodiment, the controller CTR is a device including an electronic circuit, nonvolatile memory, and so on. and can control the direction and intensity of a current flowing through the coil 4. The controller CTR may be configured to control the direction and intensity of the current flowing through the coil 4 in accordance with a control command from an external device such as a computer. Alternatively, the controller CTR may be configured to control the direction and intensity of the current flowing through the coil 4 without receiving any control command from an external device. Note that, in the present embodiment, the controller CTR is placed outside of the housing HS, but may be placed inside of the housing HS.

The movable body MB can vibrate the housing HS. In the present embodiment, the movable body MB reciprocally moves in a state of being attached in the housing HS, and thereby can vibrate the housing HS.

Figure 3A:
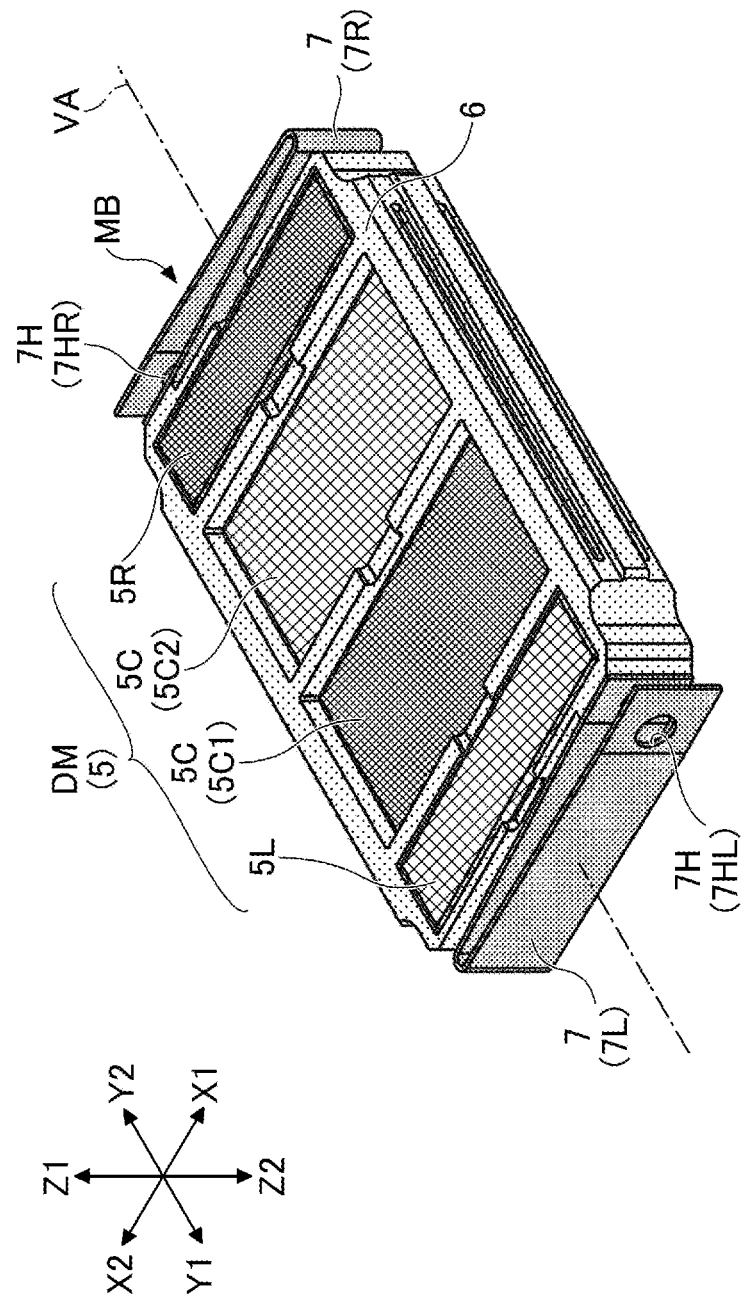
FIG. 3A is a perspective view of the whole movable body.
Figure 3B:
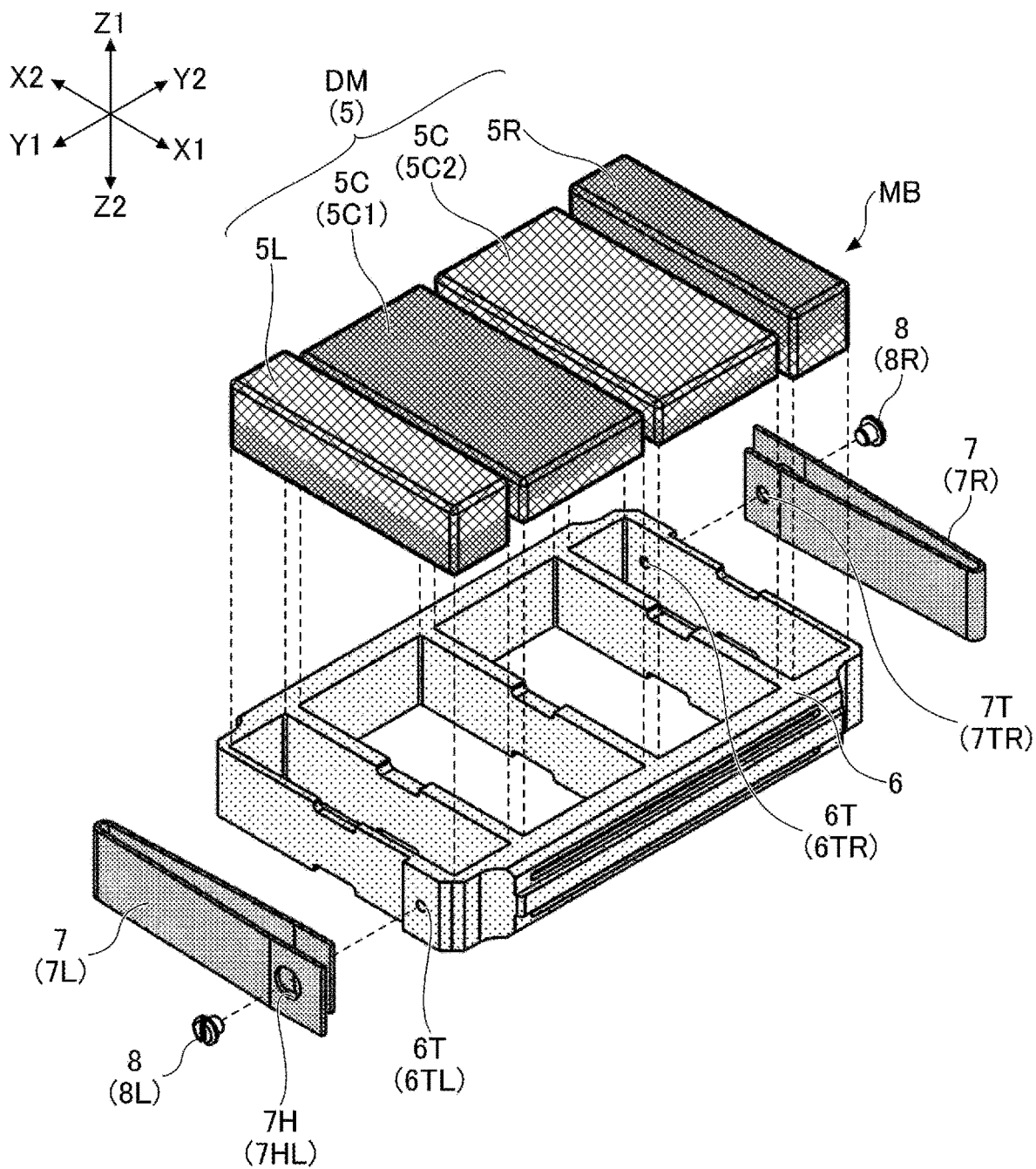
FIG. 3B is an exploded perspective view of a movable body.
Figure 4A:
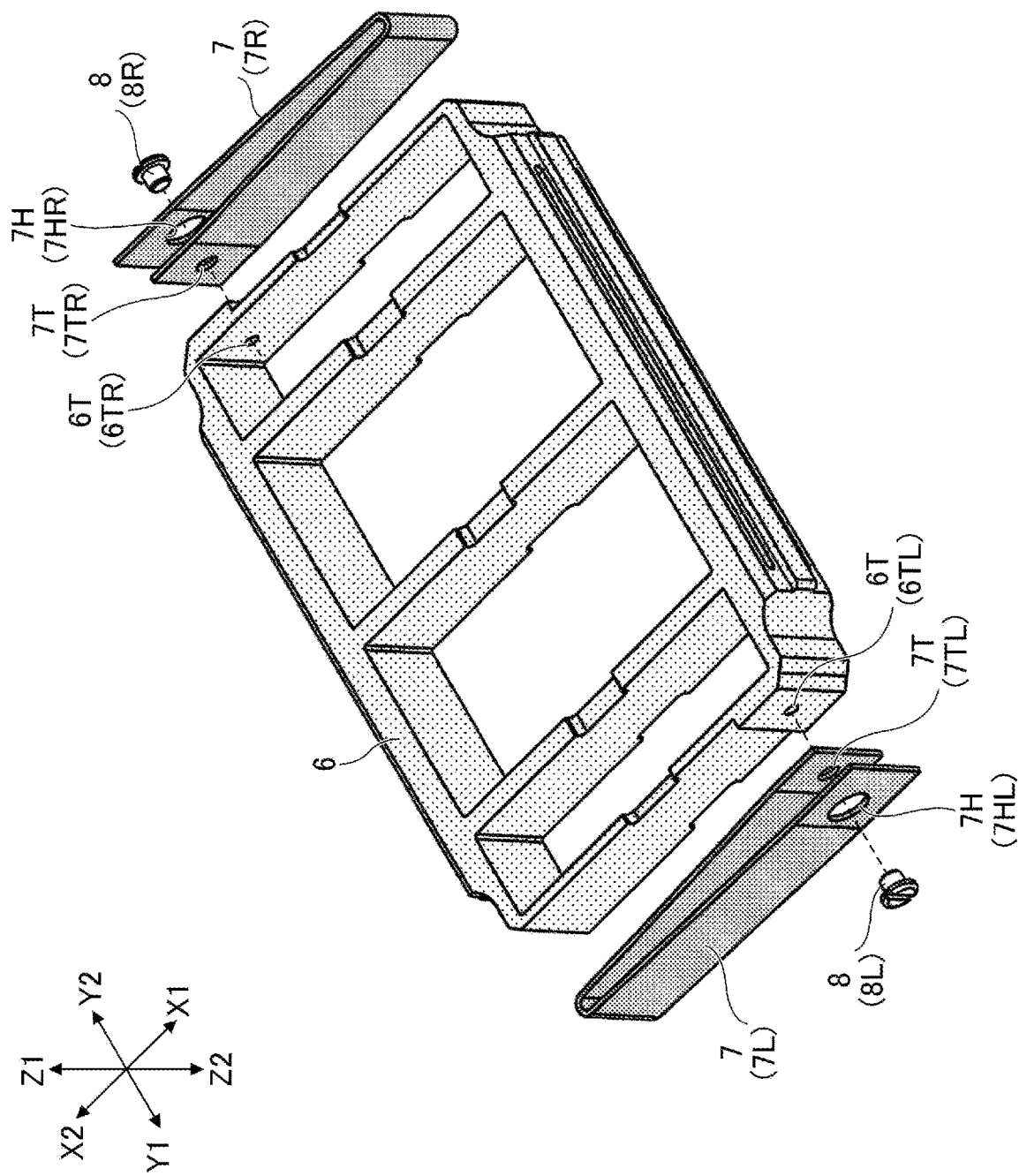
FIG. 4A is an exploded perspective view of the movable body, with illustration of a magnetic flux source being omitted.

Next, referring to FIG. 3A, FIG. 3B, FIG. 4A, and FIG. 4B, the movable body MB will be described in detail. FIG. 3A, FIG. 3B, FIG. 4A, and FIG. 4B are outline views of the movable body MB. Specifically, FIG. 3A is a perspective view of the whole movable body MB, and FIG. 3B is an exploded perspective view of the movable body MB. FIG. 4A is an exploded perspective view of the movable body MB, with illustration of a magnetic flux source 5 being omitted. FIG. 4B is a top plan view of the movable body MB attached to the side casing 2.

The movable body MB includes the magnetic flux source 5 and a magnetic flux source-retaining member 6, and is elastically supported by an elastic support member 7. Specifically, the movable body MB has a predetermined natural frequency and can reciprocally move (vibrate) relative to the housing HS (side casing 2) along a vibration axis VA (see FIG. 3A) extending in a predetermined direction.

The magnetic flux source 5 is a member forming the drive member DM and can generate a magnetic flux. In the present embodiment, the magnetic flux source 5 is a permanent magnet and includes a left-hand magnet 5L, a middle magnet 5C, and a right-hand magnet 5R. The middle magnet 5C includes a first middle magnet 5C1 and a second middle magnet 5C2. The left-hand magnet 5L, the first middle magnet 5C1, the second middle magnet 5C2, and the right-hand magnet 5R are each a bipolar-magnetized permanent magnet and are juxtaposed along the Y-axis direction.

The magnetic flux source-retaining member 6 can retain the magnetic flux source 5. In the present embodiment, the magnetic flux source-retaining member 6 is a rectangular frame member formed of a synthetic resin, and can retain the left-hand magnet 5L, the first middle magnet 5C1, the second middle magnet 5C2, and the right-hand magnet 5R along the Y-axis direction at approximately equal intervals.

The elastic support member 7 is placed between the housing HS and the movable body MB and can elastically support the movable body MB. In the present embodiment, the elastic support member 7 is a U-shape leaf spring formed of a metal plate, and includes: a left-hand leaf spring 7L to be fixed to a left-hand end of the magnetic flux source-retaining member 6; and a right-hand leaf spring 7R to be fixed to a right-hand end of the magnetic flux source-retaining member 6.

A fastening member 8 is a member for fastening the elastic support member 7 with the magnetic flux source-retaining member 6. In the present embodiment, the fastening member 8 is an external screw rotatable with a slotted head screwdriver, and is to be engaged with an internal thread hole 6T formed in the magnetic flux source-retaining member 6. Specifically, the fastening member 8 includes: a left-hand external screw 8L for fastening the left-hand leaf spring 7L with a left-hand end of the magnetic flux source-retaining member 6; and a right-hand external screw 8R for fastening the right-hand leaf spring 7R with a right-hand end of the magnetic flux source-retaining member 6.

As illustrated in FIG. 4A, the fastening member 8 is fastened with an internal thread hole 7T formed in the elastic support member 7 and an internal thread hole 6T formed in the magnetic flux source-retaining member 6 via a through-hole 2H (see FIG. 2) formed in the side plate 2A of the side casing 2 and a through-hole 7H formed in the elastic support member 7. Specifically, the left-hand external screw 8L is screwed into a left-hand internal thread hole 7TL formed in the left-hand leaf spring 7L and into a left-hand internal thread hole 6TL formed in the left-hand end of the magnetic flux source-retaining member 6 via a left-hand through-hole 2HL (see FIG. 2) formed in the second side plate 2A2 of the side casing 2 and via a left-hand through-hole 7HL formed in the left-hand leaf spring 7L. Similarly, the right-hand external screw 8R is screwed into a right-hand internal thread hole 7TR formed in the right-hand leaf spring 7R and into a right-hand internal thread hole 6TR formed in the left-hand end of the magnetic flux source-retaining member 6 via a right-hand through-hole 2HR (see FIG. 2) formed in the fourth side plate 2A4 of the side casing 2 and a right-hand through-hole 7HR formed in the right-hand leaf spring 7R.

The side casing 2 is configured such that the elastic support member 7 is fixed to the side casing 2 via no fastening member. Specifically, as illustrated in FIG. 4B, the side casing 2 includes a projection 2P formed so as to hold the outer end of the elastic support member 7. More specifically, the side casing 2 includes: a left-hand projection 2PL formed so as to hold the left-hand end of the left-hand leaf spring 7L; and a right-hand projection 2PR formed so as to hold the right-hand end of the right-hand leaf spring 7R. The left-hand end of the left-hand leaf spring 7L is inserted into, and fixed, between the inner face of the second side plate 2A2 and the left-hand projection 2PL. The right-hand end of the right-hand leaf spring 7R is inserted into, and fixed, between the inner face of the fourth side plate 2A4 and the right-hand projection 2PR.

The drive member DM is one exemplary vibration force generator, and can vibrate the movable body MB along the vibration axis VA. In the present embodiment, the drive member DM is composed of the coil 4 and the magnetic flux source 5, and can vibrate the movable body MB (magnetic flux source 5) elastically supported by the elastic support member 7 along the vibration axis VA by utilizing an electromagnetic force generated between the coil 4 and the magnetic flux source 5 in accordance with the direction and intensity of a current supplied to the coil 4 via the controller CTR.

Figure 5A:
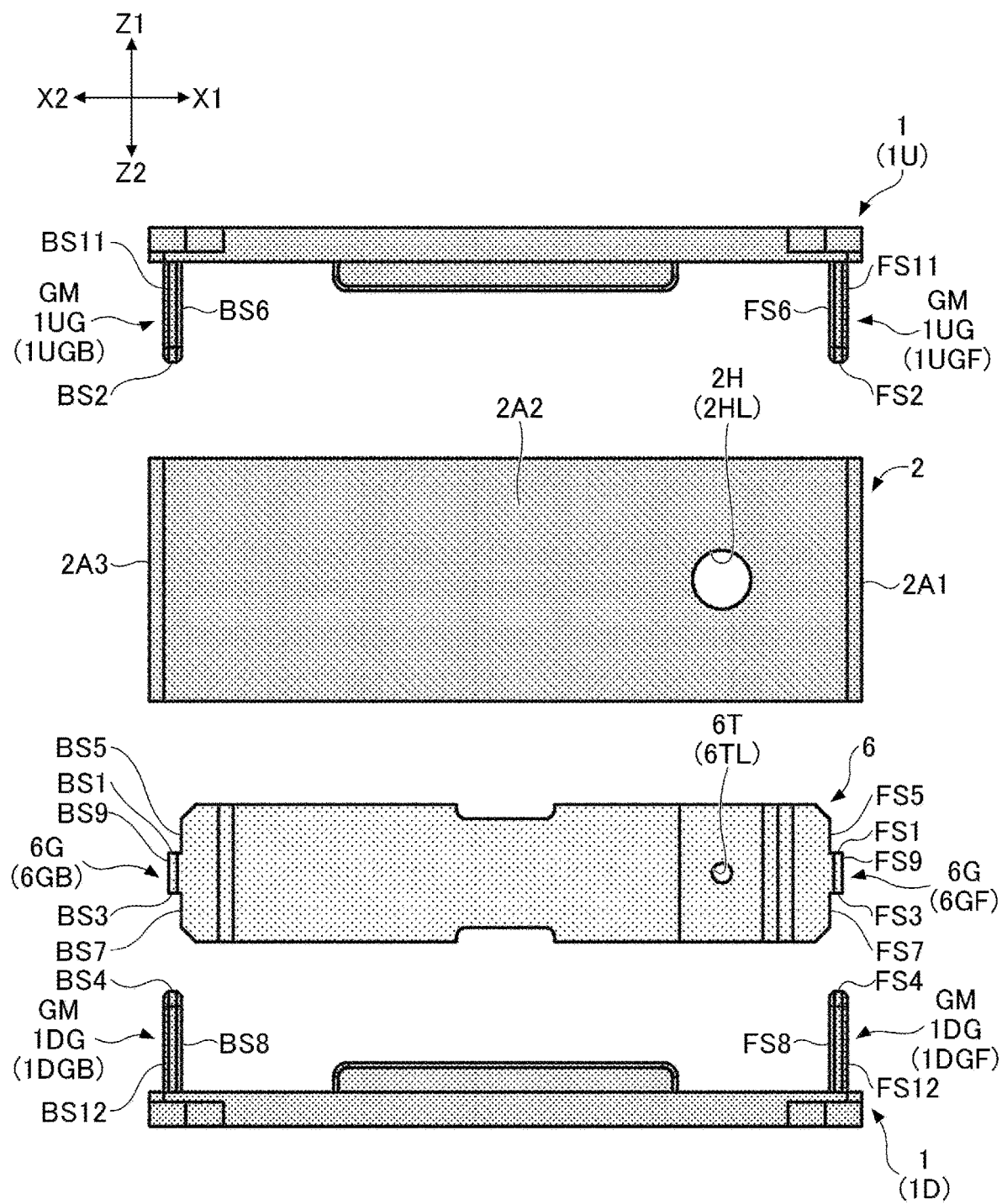
FIG. 5A is a detailed view of members that form a guide member.
Figure 6A:
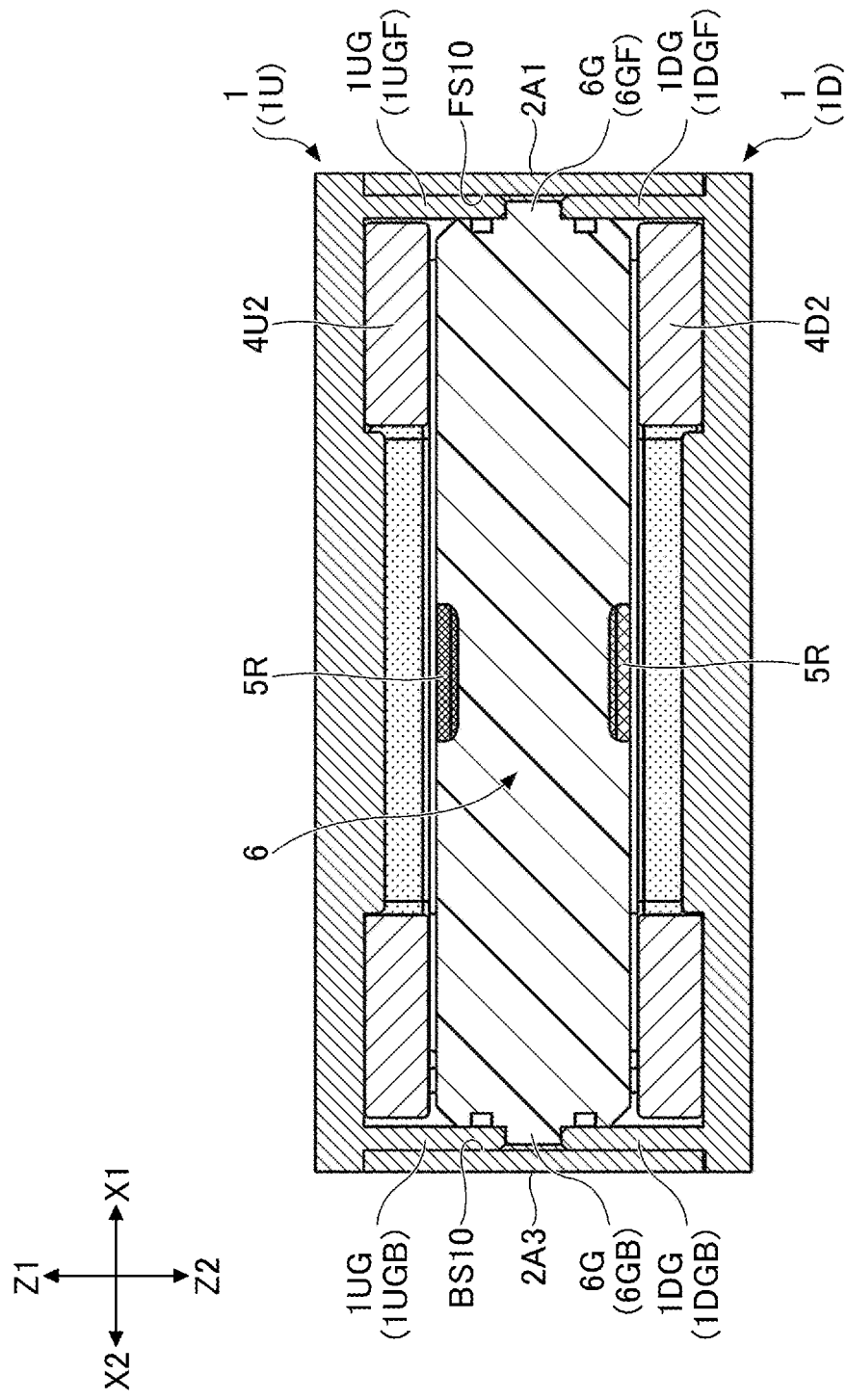
FIG. 6A is a cross-sectional view of the vibration generating device.
Figure 7A:
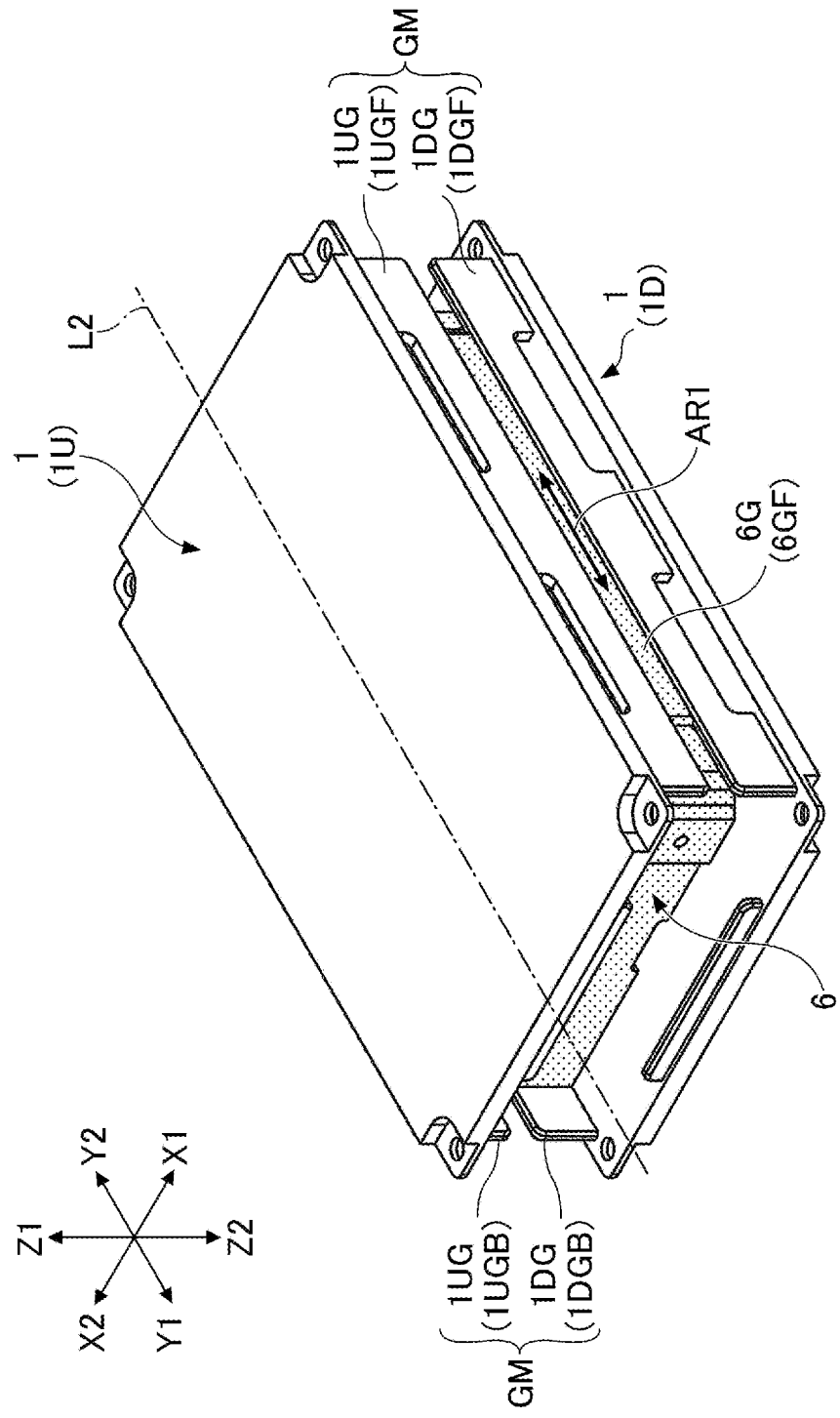
FIG. 7A is a perspective view of the members that form the guide member.
Figure 7B:
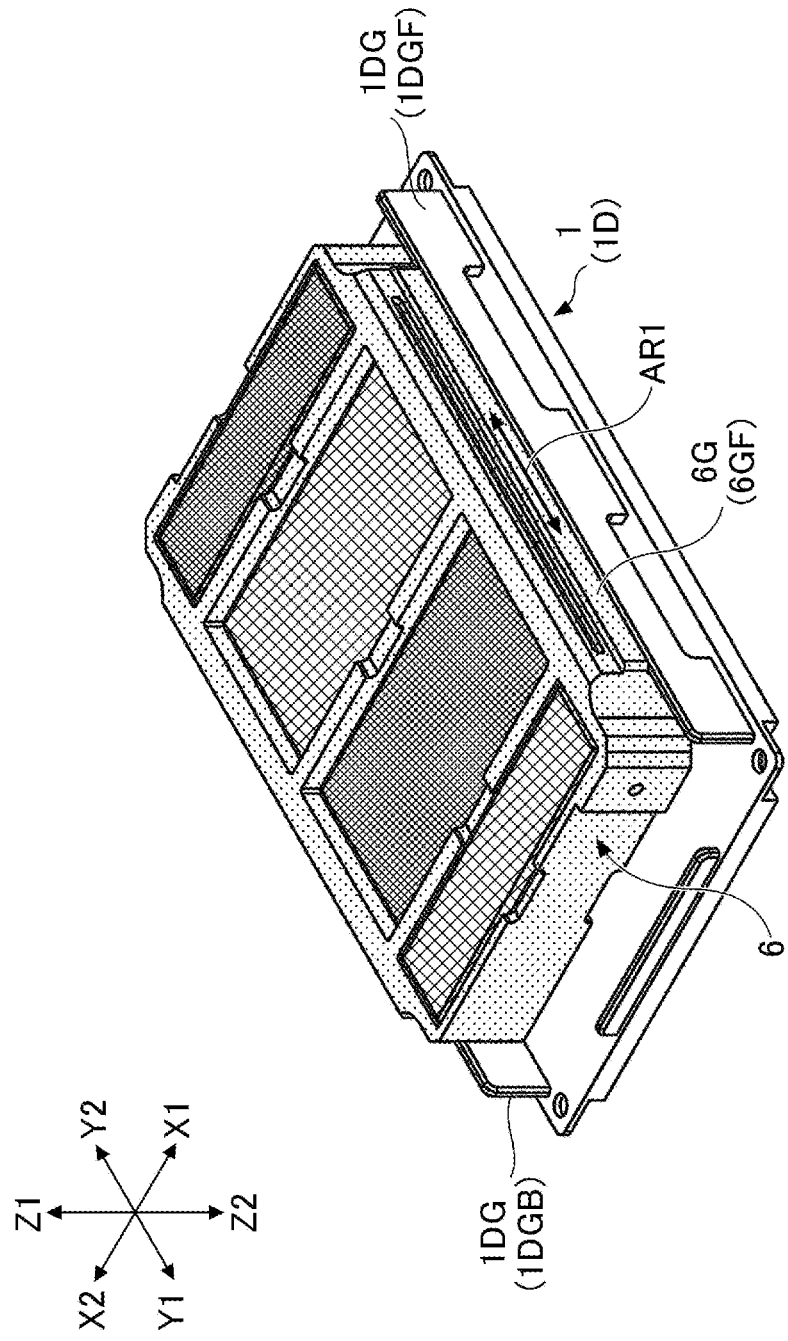
FIG. 7B is a perspective view of the members that form the guide member.

Next, referring to FIG. 5A, FIG. 5B, FIG. 6A, FIG. 6B, FIG. 7A, and FIG. 7B, a guide member GM will be described. FIG. 5A and FIG. 5B are detailed views of members that form the guide member GM. Specifically, FIG. 5A is a left side view of the upper casing 1U, the lower casing 1D, the side casing 2, and the magnetic flux source-retaining member 6 that are in an exploded state. FIG. 5B is a left side view of the upper casing 1U, the lower casing 1D, and the magnetic flux source-retaining member 6 that are in a combined state. In FIG. 5A and FIG. 5B, for ease of understanding, the casing 1 and the side casing 2 are given fine dot patterns, and the magnetic flux source-retaining member 6 is given a coarse dot pattern. Also, for simplicity, FIG. 5B does not illustrate the side casing 2 that is illustrated in FIG. 5A. FIG. 6A and FIG. 6B are cross-sectional views of the vibration generating device 101. Specifically, FIG. 6A illustrates a cross section, as viewed from the Y1 side, of the vibration generating device 101 in a plane parallel to the XZ plane including a chain dotted line L1 illustrated in FIG. 1B. FIG. 6B is the same drawing as FIG. 6A except that the coil 4 and the magnetic flux source 5 are not illustrated. FIG. 7A and FIG. 7B are perspective views of members that form the guide member GM. Specifically, FIG. 7A is a perspective view of the upper casing 1U, the lower casing 1D, and the magnetic flux source-retaining member 6 that are in a combined state. FIG. 7B is a perspective view of the lower casing 1D and the magnetic flux source-retaining member 6 that are in a combined state. In FIG. 7A and FIG. 7B, for ease of understanding, the magnetic flux source-retaining member 6 is given a coarse dot pattern. Also, FIG. 7B illustrates a state where the magnetic flux source 5 is retained by the magnetic flux source-retaining member 6.

The guide member GM can guide the movable body MB so that the movable body MB is reciprocally movable in the housing HS as the stationary body along the left-and-right direction (Y-axis direction). In the present embodiment, the guide member GM includes: an upper guide 1UG that is integrally formed with the upper casing 1U and extends downward (Z2 direction) from the upper casing 1U; and a lower guide 1DG that is integrally formed with the lower casing 1D and extends upward (Z1 direction) from the lower casing 1D. The guide member GM guides the movable body MB such that a part to be guided (hereinafter referred to as a "guided part") 6G, a projection formed in the magnetic flux source-retaining member 6 forming the movable body MB, is guided so that the guided part 6G is slidable along the left-and-right direction by the upper guide 1UG and the lower guide 1DG.

Specifically, the upper guide 1UG includes: an upper front guide 1UGF that faces the first side plate 2A1 of the side casing 2 (see FIG. 2) and extends in the Y-axis direction; and an upper back guide 1UGB that faces the third side plate 2A3 of the side casing 2 (see FIG. 2) and extends in the Y-axis direction. Similarly, the lower guide 1DG includes: a lower front guide 1DGF that faces the first side plate 2A1 of the side casing 2 (see FIG. 2) and extends in the Y-axis direction; and a lower back guide 1DGB that faces the third side plate 2A3 of the side casing 2 (see FIG. 2) and extends in the Y-axis direction.

The guided part 6G formed in the magnetic flux source-retaining member 6 includes: a front guided part 6GF that faces the first side plate 2A1 of the side casing 2 (see FIG. 2) and extends in the Y-axis direction; and a back guided part 6GB that faces the third side plate 2A3 of the side casing 2 (see FIG. 2) and extends in the Y-axis direction.

As illustrated in FIG. 5B, the tip end of the upper front guide 1UGF and the tip end of the lower front guide 1DGF are combined so as to sandwich the front guided part 6GF and face each other. Also, as illustrated in FIG. 5B, the tip end of the upper back guide 1UGB and the tip end of the lower back guide 1DGB are combined so as to sandwich the back guided part 6GB and face each other.

In the present embodiment, the tip end of the upper front guide 1UGF and the tip end of the lower front guide 1DGF are combined so as to contact the front guided part 6GF. In other words, the front guided part 6GF is formed to have approximately the same shape as a space formed between the tip end of the upper front guide 1UGF and the tip end of the lower front guide 1DGF. Specifically, the front guided part 6GF is formed as a projection of one generally cuboid shape that continuously extends over most of the total length in the longitudinal direction of the magnetic flux source-retaining member 6. However, the front guided part 6GF may be a combination of a plurality of projections that are discontinuously disposed along the longitudinal direction of the magnetic flux source-retaining member 6. The same applies to the back guided part 6GB. Also, in the present embodiment, the magnetic flux source-retaining member 6 is formed so as to be front-back symmetric. In other words, the front guided part 6GF and the back guided part 6GB are formed to have the same shape and the same size. Nonetheless, the shapes of the front guided part 6GF and the back guided part 6GB may be different from each other.

In the examples as illustrated in FIG. 5A and FIG. 5B, the magnetic flux source-retaining member 6 is configured such that a top face FS1 of the front guided part 6GF contacts a tip-end face FS2 of the upper front guide 1UGF and a bottom face FS3 of the front guided part 6GF contacts a tip-end face FS4 of the lower front guide 1DGF, in a state where the magnetic flux source-retaining member 6 is combined with the casing 1 and the side casing 2. Also, the magnetic flux source-retaining member 6 is configured such that an upper front face FS5 (a front face part at an upper position of the front guided part 6GF) contacts an inner face FS6 of the upper front guide 1UGF and a lower front face FS7 (a front face part at a lower position of the front guided part 6GF) contacts an inner face FS8 of the lower front guide 1DGF. Meanwhile, the magnetic flux source-retaining member 6 is configured such that a front face FS9 of the front guided part 6GF does not contact an inner face FS10 (see FIG. 6A) of the first side plate 2A1 of the side casing 2. Note that, the casing 1 is configured such that an outer face FS11 of the upper front guide 1UGF and the inner face FS10 of the first side plate 2A1 of the side casing 2 contact each other and an outer face FS12 of the lower front guide 1DGF and the inner face FS10 of the first side plate 2A1 of the side casing 2 contact each other.

Similarly, the magnetic flux source-retaining member 6 is configured such that a top face BS1 of the back guided part 6GB contacts a tip-end face BS2 of the upper back guide 1UGB and a bottom face BS3 of the back guided part 6GB contacts a tip-end face BS4 of the lower back guide 1DGB, in a state where the magnetic flux source-retaining member 6 is combined with the casing 1 and the side casing 2. Also, the magnetic flux source-retaining member 6 is configured such that an upper back face BS5 (a back face part at an upper position of the back guided part 6GB) contacts an inner face BS6 of the upper back guide 1UGB and a lower back face BS7 (a back face part at a lower position of the back guided part 6GB) contacts an inner face BS8 of the lower back guide 1DGB. Meanwhile, the magnetic flux source-retaining member 6 is configured such that a back face BS9 of the back guided part 6GB does not contact an inner face BS10 (see FIG. 6A) of the third side plate 2A3 of the side casing 2. Note that, the casing 1 is configured such that an outer face BS11 of the upper back guide 1UGB and the inner face BS10 of the third side plate 2A3 of the side casing 2 contact each other and an outer face BS12 of the lower back guide 1DGB and the inner face BS10 of the third side plate 2A3 of the side casing 2 contact each other.

As described above, the guided part 6G is slidable between the upper guide 1UG and the lower guide 1DG in the directions indicated by a double-headed arrow AR1 in each of FIG. 7A and FIG. 7B. Specifically, the guided part 6G can reciprocally move in the left-and-right direction (Y-axis direction) with the top face thereof contacting the tip-end face of the upper guide 1UG and the bottom face thereof contacting the tip-end face of the lower guide 1DG.

With this configuration, the magnetic flux source-retaining member 6 is restricted from moving in the front-and-back direction and in the up-and-down direction, but is allowed to smoothly move in the left-and-right direction.

Figure 8A:
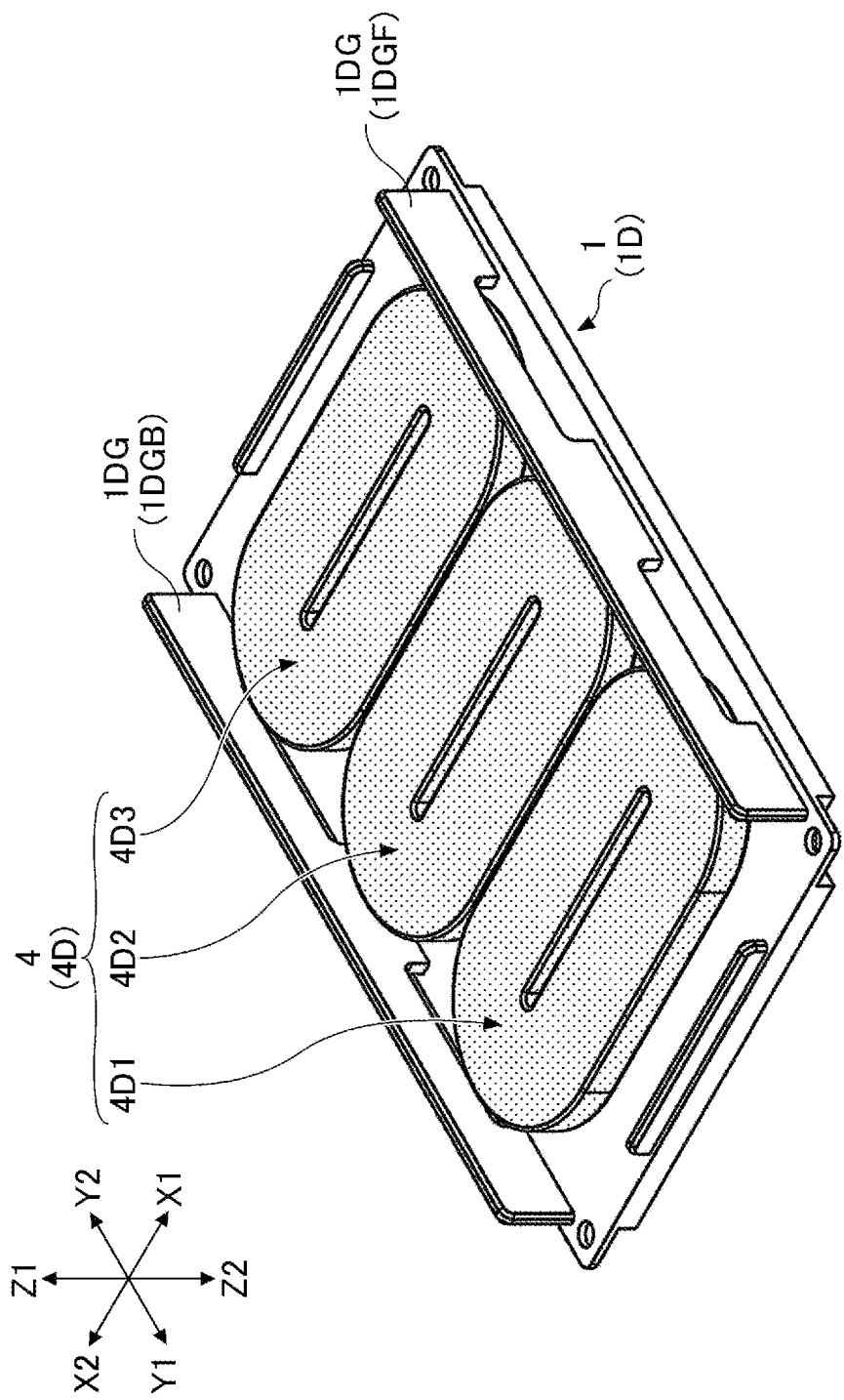
FIG. 8A is a perspective view of a coil that is fixed to a housing.
Figure 8B:
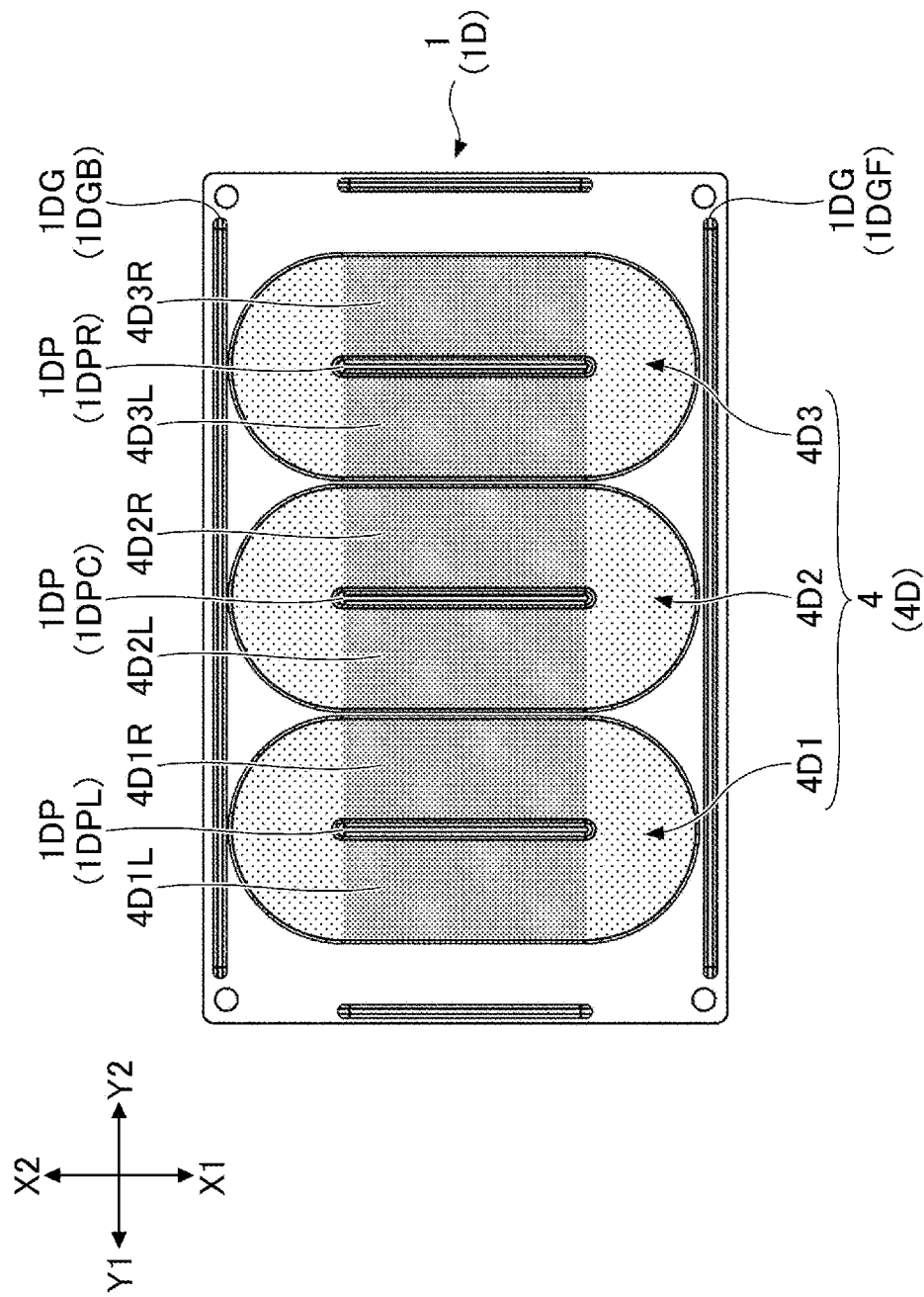
FIG. 8B is a top plan view of the coil that is fixed to the housing.
Figure 9A:
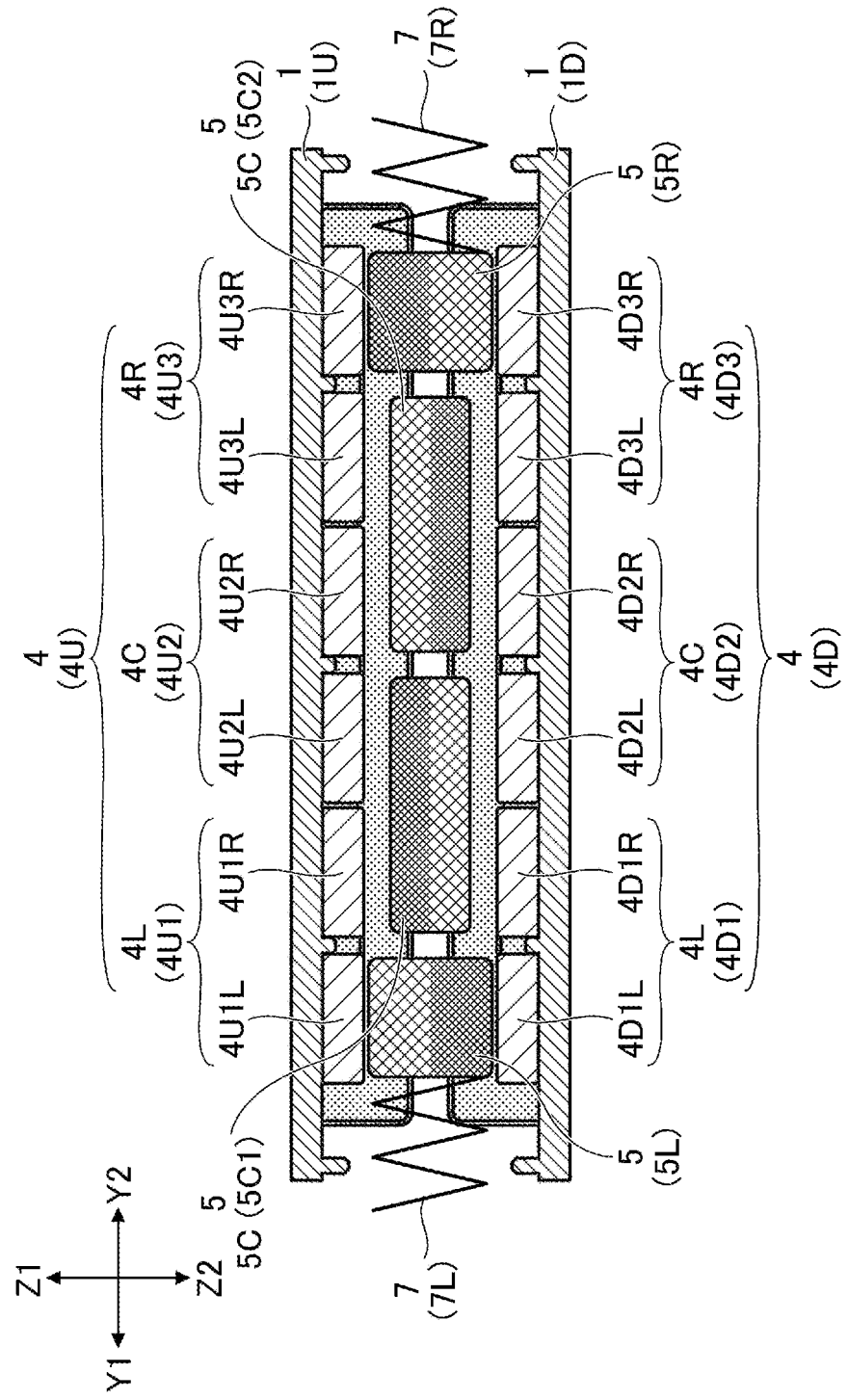
FIG. 9A is a cross-sectional view of a casing, the coil, and a magnetic flux source.
Figure 9B:
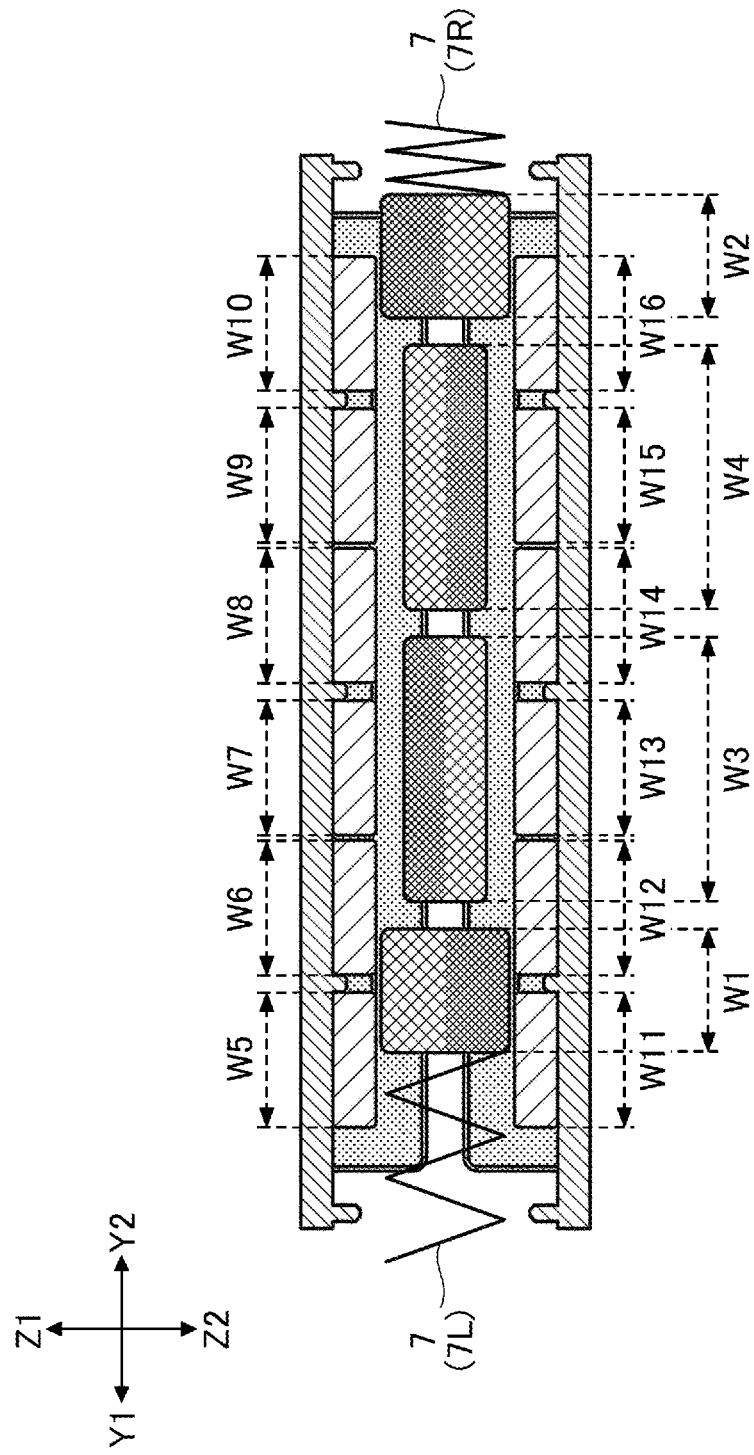
FIG. 9B is a cross-sectional view of the casing, the coil, and the magnetic flux source.
Figure 9C:
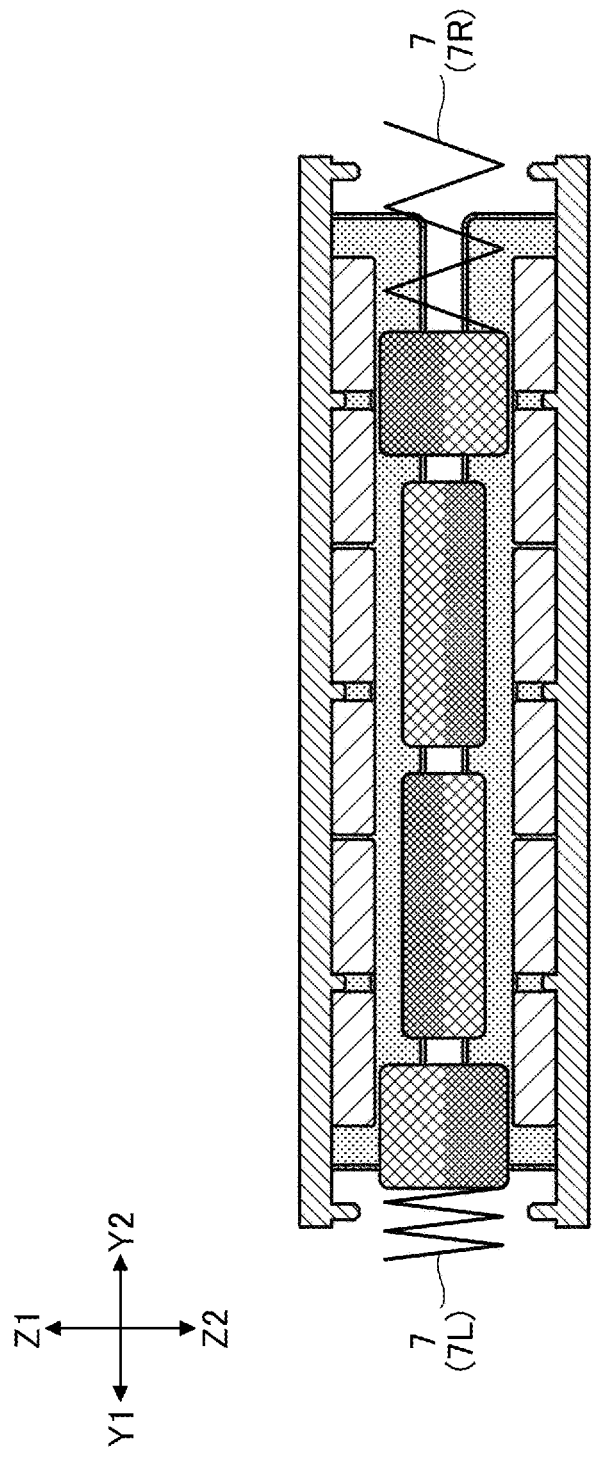
FIG. 9C is a cross-sectional view of the casing, the coil, and the magnetic flux source.
Figure 10A:
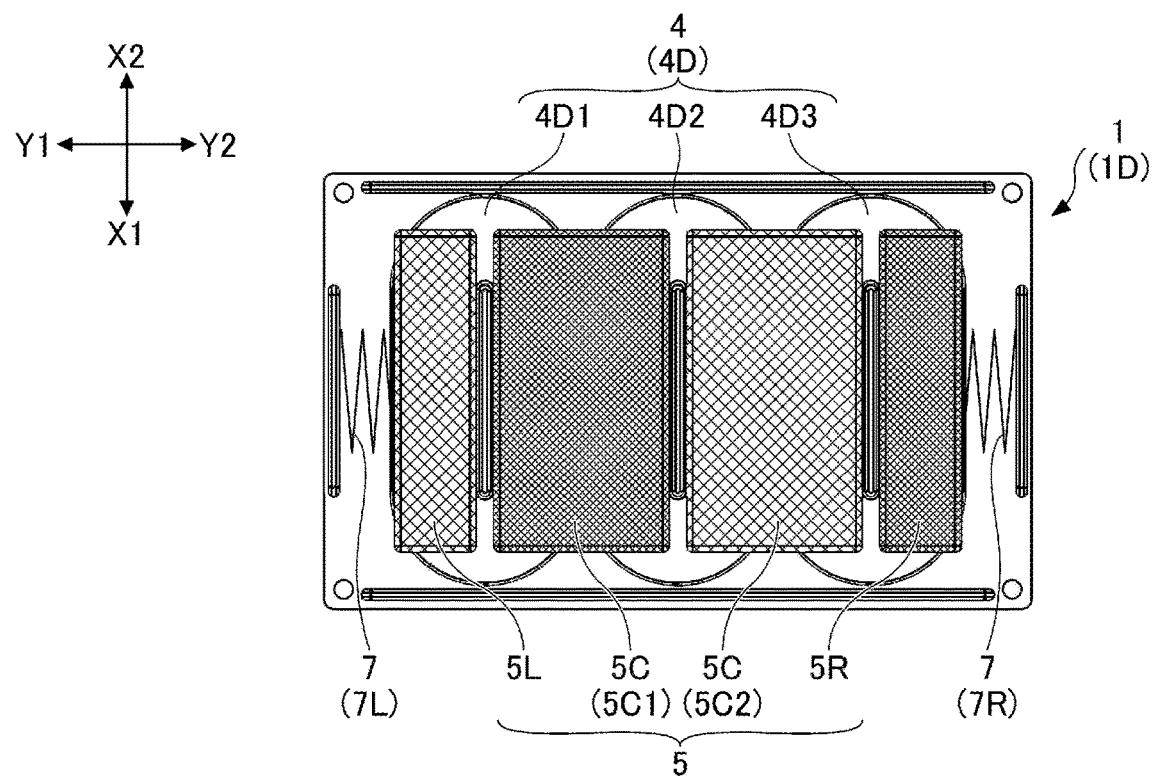
FIG. 10A is a top plan view of a lower casing, a lower coil, and the magnetic flux source.
Figure 10B:
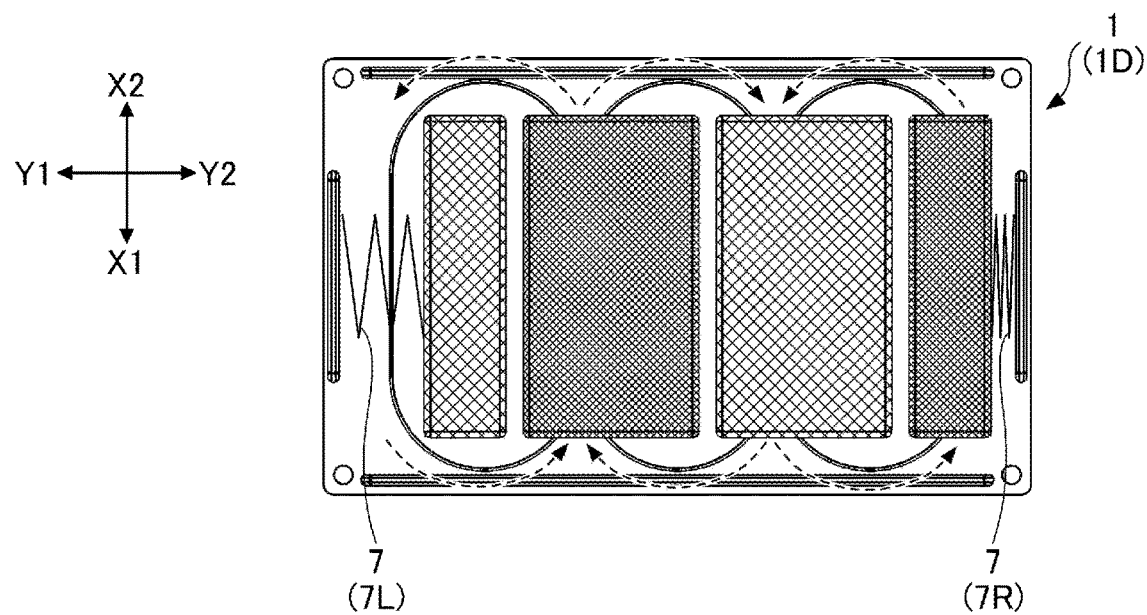
FIG. 10B is a top plan view of the lower casing, the lower coil, and the magnetic flux source.
Figure 10C:
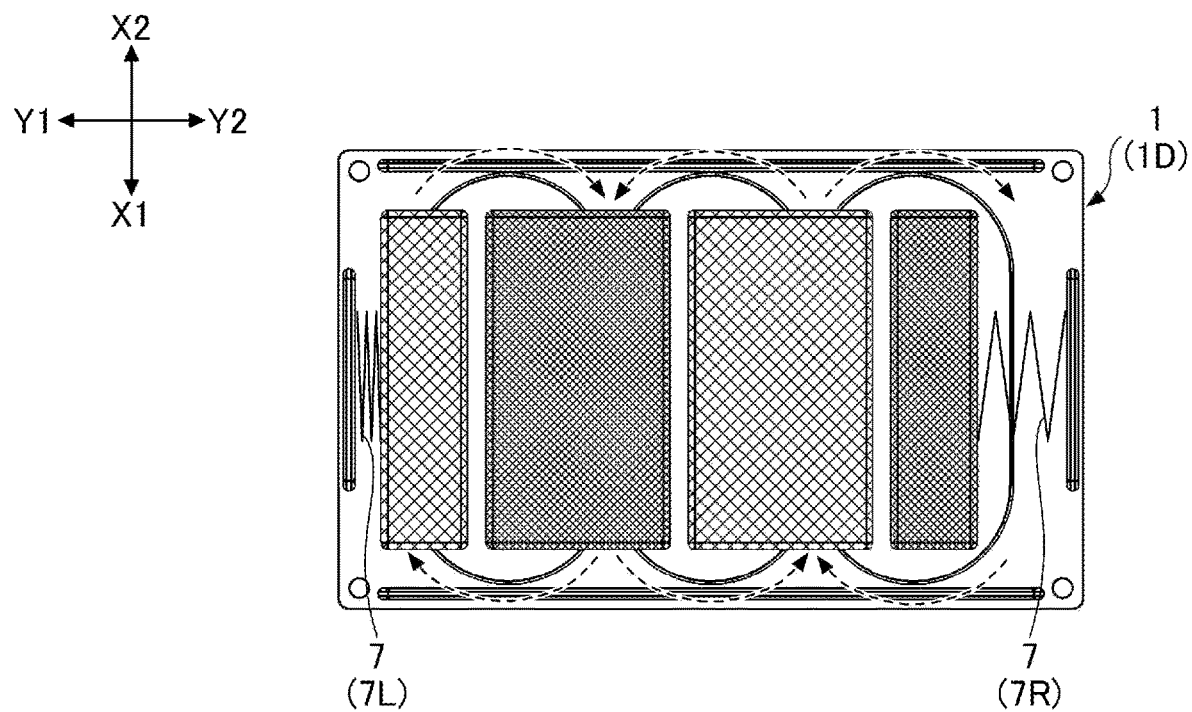
FIG. 10C is a top plan view of the lower casing, the lower coil, and the magnetic flux source.

Next, referring to FIG. 8A, FIG. 8B, FIG. 9A to FIG. 9C, and FIG. 10A to FIG. 10C, the drive member DM will be described in detail. FIG. 8A and FIG. 8B are detailed views of the coil 4 that is fixed to the housing HS as the stationary body. Specifically, FIG. 8A is a perspective view of the lower coil 4D that is fixed to the lower casing 1D. FIG. 8B is a top plan view of the lower coil 4D that is fixed to the lower casing 1D. In FIG. 8A and FIG. 8B, for ease of understanding, the lower coil 4D is given a dot pattern. FIG. 9A to FIG. 9C illustrate cross sections, as viewed from the X1 side, of the casing 1, the coil 4, and the magnetic flux source 5 in an imaginary plane parallel to the YZ plane including a chain dotted line L2 illustrated in FIG. 7A. Specifically, FIG. 9A is a cross-sectional view of the casing 1, the coil 4, and the magnetic flux source 5 when the movable body MB (magnetic flux source 5) is located at the center of the movable range. FIG. 9B is a cross-sectional view of the casing 1, the coil 4, and the magnetic flux source 5 when the movable body MB (magnetic flux source 5) is located at the right-hand end of the movable range. FIG. 9C is a cross-sectional view of the casing 1, the coil 4, and the magnetic flux source 5 when the movable body MB (magnetic flux source 5) is located at the left-hand end of the movable range. In FIG. 9A to FIG. 9C, for ease of understanding, the permanent magnet as the magnetic flux source 5 is given a rough cross pattern in the N pole thereof and a fine cross pattern in the S pole thereof, instead of a pattern representing a cross section. The same applies to some relevant drawings. FIG. 10A to FIG. 10C are top plan views of the magnetic flux source 5 that is movable, in the left-and-right direction (Y-axis direction), on the lower coil 4D fixed to the lower casing 1D. Specifically, FIG. 10A is a top plan view of the lower casing 1D, the lower coil 4D, and the magnetic flux source 5 when the movable body MB (magnetic flux source 5) is located at the center of the movable range. FIG. 10B is a top plan view of the lower casing 1D, the lower coil 4D, and the magnetic flux source 5 when the movable body MB (magnetic flux source 5) is located at the right-hand end of the movable range. FIG. 10C is a top plan view of the lower casing 1D, the lower coil 4D, and the magnetic flux source 5 when the movable body MB (magnetic flux source 5) is located at the left-hand end of the movable range.

Note that, for simplicity, FIG. 9A to FIG. 9C and FIG. 10A to FIG. 10C schematically illustrate a stretchable state of the elastic support member 7 with a figure representing a spring.

As illustrated in FIG. 2, the coil 4, one component of the drive member DM, includes: the upper coil 4U that is fixed to a bottom (Z2-side) face of the upper casing 1U; and the lower coil 4D that is fixed to a top (Z1-side) face of the lower casing 1D.

As illustrated in FIG. 8A and FIG. 8B, the lower coil 4D includes three coils (the first lower coil 4D1, the second lower coil 4D2, and the third lower coil 4D3) that are fixed with an adhesive to the top face (Z1-side face) of the lower casing 1D. The following description given with reference to FIG. 8A and FIG. 8B is related to the lower coil 4D, but is similarly applied to the upper coil 4U as well. This is because the upper casing 1U and the lower casing 1D have the same shape and the same size and the upper coil 4U and the lower coil 4D have the same shape and the same size.

As illustrated in FIG. 2 and FIG. 8B, the top face of the lower casing 1D is provided with a lower projection 1DP that projects upward (Z1 direction) and has a generally cuboid shape. Specifically, the lower projection 1DP includes a left-hand lower projection 1DPL for retaining the first lower coil 4D1, a middle lower projection 1DPC for retaining the second lower coil 4D2, and a right-hand lower projection 1DPR for retaining the third lower coil 4D3.

The first lower coil 4D1 includes: a left-hand wire bundle 4D1L that is located at a left-hand side (Y1 side) of the left-hand lower projection 1DPL and extends along the left-hand lower projection 1DPL; and a right-hand wire bundle 4D1R that is located at a right-hand side (Y2 side) of the left-hand lower projection 1DPL and extends along the left-hand lower projection 1DPL. Note that, the wire bundle means a part in which the electrically conductive wire forming the coil extends along the front-and-back direction (X-axis direction).

In FIG. 8B, for ease of understanding, the left-hand wire bundle 4D1L and the right-hand wire bundle 4D1R of the first lower coil 4D1 are given finer dot patterns than dot patterns given to the other parts in the first lower coil 4D1. The same applies to the second lower coil 4D2 and the third lower coil 4D3.

The second lower coil 4D2 includes: a left-hand wire bundle 4D2L that is located at a left-hand side (Y1 side) of the middle lower projection 1DPC and extends along the middle lower projection 1DPC; and a right-hand wire bundle 4D2R that is located at a right-hand side (Y2 side) of the middle lower projection 1DPC and extends along the middle lower projection 1DPC.

Similarly, the third lower coil 4D3 includes: a left-hand wire bundle 4D3L that is located at a left-hand side (Y1 side) of the right-hand lower projection 1DPR and extends along the right-hand lower projection 1DPR; and a right-hand wire bundle 4D3R that is located at a right-hand side (Y2 side) of the right-hand lower projection 1DPR and extends along the right-hand lower projection 1DPR.

The left-hand wire bundle 4D1L and the right-hand wire bundle 4D1R of the first lower coil 4D1 are areas through which the magnetic flux generated by the magnetic flux source 5 passes; i.e., areas where a driving force based on a Lorentz force for moving the movable body MB in the left-and-right direction is generated. The same applies to the left-hand wire bundle 4D2L and the right-hand wire bundle 4D2R of the second lower coil 4D2, and to the left-hand wire bundle 4D3L and the right-hand wire bundle 4D3R of the third lower coil 4D3.

As illustrated in FIG. 9A to FIG. 9C, the magnetic flux source 5, another component of the drive member DM, is disposed in a space between the upper coil 4U and the lower coil 4D so as to be movable in the left-and-right direction (Y-axis direction). Specifically, the magnetic flux source 5 includes the left-hand magnet 5L, the first middle magnet 5C1, the second middle magnet 5C2, and the right-hand magnet 5R. The left-hand magnet 5L, the first middle magnet 5C1, the second middle magnet 5C2, and the right-hand magnet 5R are retained by the magnetic flux source-retaining member 6, not illustrated in FIG. 9A to FIG. 9C, in a state of being spaced from each other with predetermined intervals.

In the present embodiment, as illustrated in FIG. 9B, the left-hand magnet 5L has a width W1 that is approximately the same as a width W2 of the right-hand magnet 5R. The first middle magnet 5C1 has a width W3 that is approximately the same as a width W4 of the second middle magnet 5C2. The width W1 of the left-hand magnet 5L is approximately half the width W3 of the first middle magnet 5C1.

In the present embodiment, the six coils forming the coil 4 have the same shape and the same size. In other words, a width W5 of a left-hand wire bundle 4U1L of the first upper coil 4U1, a width W6 of a right-hand wire bundle 4U1R of the first upper coil 4U1, a width W7 of a left-hand wire bundle 4U2L of the second upper coil 4U2, a width W8 of a right-hand wire bundle 4U2R of the second upper coil 4U2, a width W9 of a left-hand wire bundle 4U3L of the third upper coil 4U3, a width W10 of a right-hand wire bundle 4U3R of the third upper coil 4U3, a width W11 of a left-hand wire bundle 4D1L of the first lower coil 4D1, a width W12 of a right-hand wire bundle 4D1R of the first lower coil 4D1, a width W13 of a left-hand wire bundle 4D2L of the second lower coil 4D2, a width W14 of a right-hand wire bundle 4D2R of the second lower coil 4D2, a width W15 of a left-hand wire bundle 4D3L of the third lower coil 4D3, and a width W16 of a right-hand wire bundle 4D3R of the third lower coil 4D3 are all the same size.

The width W1 of the left-hand magnet 5L is approximately the same as the width W5 of the left-hand wire bundle 4U1L of the first upper coil 4U1. The width W3 of the first middle magnet 5C1 is approximately the same as the total of the width W6 of the right-hand wire bundle 4U1R of the first upper coil 4U1 and the width W7 of the left-hand wire bundle 4U2L of the second upper coil 4U2.

As illustrated in FIG. 9A, when the movable body MB (magnetic flux source 5) is located at the center of the movable range, the left-hand magnet 5L is disposed such that the N pole (upper part) thereof faces the left-hand wire bundle 4U1L of the first upper coil 4U1 and the S pole (lower part) thereof faces the left-hand wire bundle 4D1L of the first lower coil 4D1. The first middle magnet 5C1 is disposed such that the S pole (upper part) thereof faces the right-hand wire bundle 4U1R of the first upper coil 4U1 and the left-hand wire bundle 4U2L of the second upper coil 4U2 and the N pole (lower part) thereof faces the right-hand wire bundle 4D1R of the first lower coil 4D1 and the left-hand wire bundle 4D2L of the second lower coil 4D2. The second middle magnet 5C2 is disposed such that the N pole (upper part) thereof faces the right-hand wire bundle 4U2R of the second upper coil 4U2 and the left-hand wire bundle 4U3L of the third upper coil 4U3 and the S pole (lower part) thereof faces the right-hand wire bundle 4D2R of the second lower coil 4D2 and the left-hand wire bundle 4D3L of the third lower coil 4D3. The right-hand magnet 5R is disposed such that the S pole (upper part) thereof faces the right-hand wire bundle 4U3R of the third upper coil 4U3 and the N pole (lower part) thereof faces the right-hand wire bundle 4D3R of the third lower coil 4D3.

When a current flows through the lower coil 4D as indicated by dashed-line arrows in FIG. 10B, the movable body MB (magnetic flux source 5) slides rightward (Y2 direction) while being guided by the guide member GM. Specifically, when the current flows through the first lower coil 4D1 counterclockwise in a top plan view thereof, the current flows through the second lower coil 4D2 clockwise in a top plan view thereof, and the current flows through the third lower coil 4D3 counterclockwise in a top plan view thereof, the movable body MB (magnetic flux source 5) slides rightward (Y2 direction).

This is because the left-hand magnet 5L, the first middle magnet 5C1, the second middle magnet 5C2, and the right-hand magnet 5R as the magnetic flux source 5 are moved rightward by a reaction force against a Lorentz force applied to charged particles that are moving through the electrically conductive wires forming the lower coil 4D fixed to the lower casing 1D.

Similarly, when a current flows through the lower coil 4D as indicated by dashed-line arrows in FIG. 10C, the movable body MB (magnetic flux source 5) slides leftward (Y1 direction) while being guided by the guide member GM. Specifically, when the current flows through the first lower coil 4D1 clockwise in a top plan view thereof, the current flows through the second lower coil 4D2 counterclockwise in a top plan view thereof, and the current flows through the third lower coil 4D3 clockwise in a top plan view thereof, the movable body MB (magnetic flux source 5) slides leftward (Y1 direction).

When the movable body MB (magnetic flux source 5) slides rightward (Y2 direction), the right-hand leaf spring 7R fixed to the right-hand end of the movable body MB (magnetic flux source-retaining member 6) is contracted. The contracted right-hand leaf spring 7R generates a resilient force to return the movable body MB to the center of the movable range (a resilient force to push back the movable body MB leftward) when a force to move the movable body MB rightward ceases; i.e., the current flowing through the coil 4 ceases. Meanwhile, when the movable body MB (magnetic flux source 5) slides rightward (Y2 direction), the left-hand leaf spring 7L fixed to the left-hand end of the movable body MB (magnetic flux source-retaining member 6) is elongated. The elongated left-hand leaf spring 7L generates a resilient force to return the movable body MB to the center of the movable range (a resilient force to pull back the movable body MB leftward) when a force to move the movable body MB rightward ceases; i.e., the current flowing through the coil 4 ceases. The same applies to the case in which the movable body MB (magnetic flux source 5) slides leftward (Y1 direction).

Therefore, the movable body MB located at a position off the center of the movable range is returned to the center of the movable range by a resilient force of the elastic support member 7 when supply of the current to the coil 4 is stopped. In this way, the drive member DM can vibrate the movable body MB in the left-and-right direction.

Figure 11A:
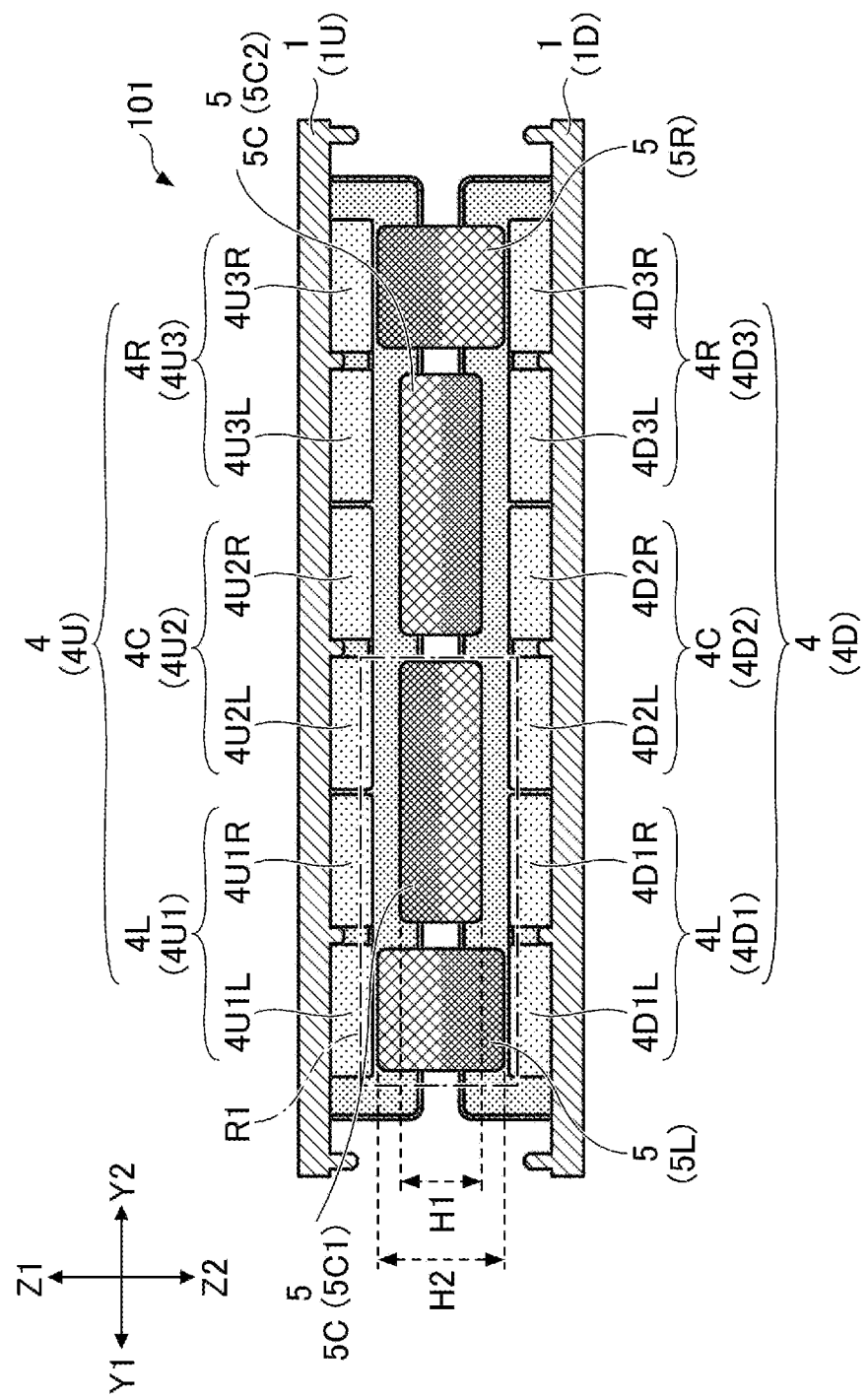
FIG. 11A is a cross-sectional view of the casing, the coil, and the magnetic flux source.
Figure 11B:
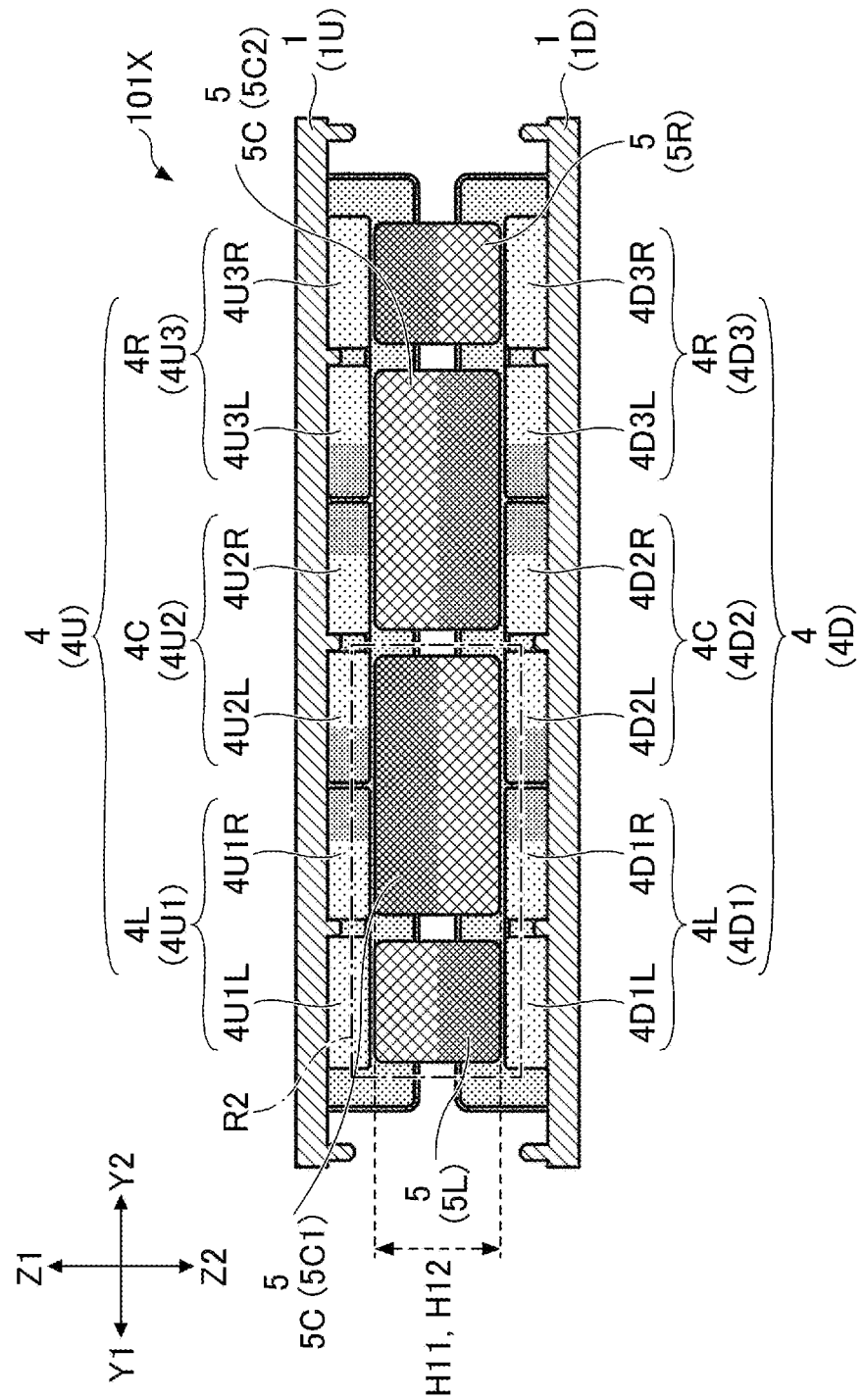
FIG. 11B is a cross-sectional view of the casing, the coil, and the magnetic flux source.

Next, referring to FIG. 11A and FIG. 11B, the magnetic flux source 5 will be described in detail. FIG. 11A and FIG. 11B, each corresponding to FIG. 9A, are cross-sectional views of the casing 1, the coil 4, and the magnetic flux source 5. Specifically, FIG. 11A is a cross-sectional view of the casing 1, the coil 4, and the magnetic flux source 5 in the vibration generating device 101 when the movable body MB (magnetic flux source 5) is located at the center of the movable range. FIG. 11B is a cross-sectional view of the casing 1, the coil 4, and the magnetic flux source 5 in a vibration generating device 101X as a referential example.

The vibration generating device 101 is different from the vibration generating device 101X in that a height H1 of the middle magnet 5C is lower than a height H2 of each of the left-hand magnet 5L and the right-hand magnet 5R; i.e., a gap (distance) between the coil 4 and the middle magnet 5C is larger than a gap (distance) between the coil 4 and each of the left-hand magnet 5L and the right-hand magnet 5R. However, the vibration generating device 101 and the vibration generating device 101X are common in the rest. Therefore, hereinafter, description of common parts will be omitted, and different parts will be described in detail.

In the vibration generating device 101X, the magnetic flux source 5 is configured such that a height H11 of the middle magnet 5C becomes the same as a height H12 of each of the left-hand magnet 5L and the right-hand magnet 5R. In other words, the magnetic flux source 5 is configured such that a distance between the coil 4 and the middle magnet 5C becomes the same as a distance between the coil 4 and each of the left-hand magnet 5L and the right-hand magnet 5R. In this case, the intensity of the magnetic field passing through the wire bundle of the coil 4 is not uniform from position to position. Note that, in FIG. 11A and FIG. 11B, for ease of understanding, the intensity of the magnetic field passing through the coil 4 is represented by fine or coarse dot patterns given to the cross sections of the coil 4. Specifically, in FIG. 11A and FIG. 11B, the finer dot patterns given to the cross sections of the coil 4 indicate the higher intensity of the magnetic field.

More specifically, FIG. 11A illustrates that the intensity of the magnetic field passing through the left-hand wire bundle 4U1L and the right-hand wire bundle 4U1R of the first upper coil 4U1, the left-hand wire bundle 4U2L and the right-hand wire bundle 4U2R of the second upper coil 4U2, the left-hand wire bundle 4U3L and the right-hand wire bundle 4U3R of the third upper coil 4U3, the left-hand wire bundle 4D1L and the right-hand wire bundle 4D1R of the first lower coil 4D1, the left-hand wire bundle 4D2L and the right-hand wire bundle 4D2R of the second lower coil 4D2, and the left-hand wire bundle 4D3L and the right-hand wire bundle 4D3R of the third lower coil 4D3 is approximately the same.

Meanwhile, FIG. 11B illustrates that the density of the magnetic fluxes passing through a right-hand part of the right-hand wire bundle 4U1R of the first upper coil 4U1, a left-hand part of the left-hand wire bundle 4U2L of the second upper coil 4U2, a right-hand part of the right-hand wire bundle 4U2R of the second upper coil 4U2, a left-hand part of the left-hand wire bundle 4U3L of the third upper coil 4U3, a right-hand part of the right-hand wire bundle 4D1R of the first lower coil 4D1, a left-hand part of the left-hand wire bundle 4D2L of the second lower coil 4D2, a right-hand part of the right-hand wire bundle 4D2R of the second lower coil 4D2, and a left-hand part of the left-hand wire bundle 4D3L of the third lower coil 4D3 is higher than the density of the magnetic fluxes passing through the other wire bundles of the coil 4. Hereinafter, a part having a relatively high magnetic flux density in the coil 4 is referred to as a "magnetic flux concentration part".

In the vibration generating device 101X as illustrated in FIG. 11B, when the movable body MB (magnetic flux source 5) moves rightward, the magnetic flux concentration part moves rightward as well. Therefore, the intensity of the magnetic field passing through the right-hand wire bundle 4U1R of the first upper coil 4U1, the left-hand wire bundle 4U2L and the right-hand wire bundle 4U2R of the second upper coil 4U2, the left-hand wire bundle 4U3L of the third upper coil 4U3, the right-hand wire bundle 4D1R of the first lower coil 4D1, the left-hand wire bundle 4D2L and the right-hand wire bundle 4D2R of the second lower coil 4D2, and the left-hand wire bundle 4D3L of the third lower coil 4D3 changes in accordance with the movement of the movable body MB (magnetic flux source 5). As a result, an induced electromotive force is generated in the coil 4 through electromagnetic induction caused by the change in the intensity of the magnetic field (magnetic flux density) and inhibits the movement of the movable body MB rightward. The same applies to when the movable body MB (magnetic flux source 5) moves leftward.

Meanwhile, the vibration generating device 101 as illustrated in FIG. 11A is configured such that the magnetic flux concentration part does not occur. Therefore, even if the movable body MB (magnetic flux source 5) moves in the left-and-right direction, the intensity of the magnetic field passing through the wire bundles of the coil 4 is not rapidly changed, an excessive induced electromotive force due to change in the intensity of the magnetic field (magnetic flux density) is not generated, and the movement of the movable body MB is not excessively prevented. In the example as illustrated in FIG. 11A, the configuration in which the magnetic flux concentration part does not occur is realized by the configuration in which the height H1 of the middle magnet 5C (the first middle magnet 5C1 and the second middle magnet 5C2) is lower than the height H2 of each of the left-hand magnet 5L and the right-hand magnet 5R.

Here, referring to FIG. 12A and FIG. 12B, why the magnetic flux concentration part occurs will be described. FIG. 12A and FIG. 12B are enlarged views of the left-hand magnet 5L facing the left-hand wire bundle 4U1L of the first upper coil 4U1, and the first middle magnet 5C1 facing the right-hand wire bundle 4U1R of the first upper coil 4U1 and the left-hand wire bundle 4U2L of the second upper coil 4U2. Specifically, FIG. 12A is an enlarged view of a range R1 surrounded by a chain dotted line in FIG. 11A, and FIG. 12B is an enlarged view of a range R2 surrounded by a chain dotted line in FIG. 11B. The dotted lines in FIG. 12A and FIG. 12B schematically represent a part of the magnetic flux extending from the magnetic flux source 5.

As illustrated in FIG. 12A and FIG. 12B, the magnetic flux extending from the left-hand magnet 5L is formed such that the magnetic flux extending from closer positions to the left-hand end of the left-hand magnet 5L spreads further leftward and such that the magnetic flux extending from closer positions to the right-hand end of the left-hand magnet 5L spreads further rightward. In other words, the magnetic flux extending from the left-hand magnet 5L is formed such that the magnetic flux extending from closer positions to the middle part of the left-hand magnet 5L extends straight along the Z axis and vertically passes through the left-hand wire bundle 4U1L.

Similarly, the magnetic flux extending from the first middle magnet 5C1 is formed such that the magnetic flux extending from closer positions to the left-hand end of the first middle magnet 5C1 spreads further leftward and such that the magnetic flux extending from closer positions to the right-hand end of the first middle magnet 5C1 spreads further rightward. In other words, the magnetic flux extending from the first middle magnet 5C1 is formed such that the magnetic flux extending from closer positions to the middle part of the first middle magnet 5C1 extends straight along the Z axis and vertically passes through each of the right-hand wire bundle 4U1R and the left-hand wire bundle 4U2L.

As illustrated in FIG. 12B, a gap between the right-hand wire bundle 4U1R and the first middle magnet 5C1 in the vibration generating device 101X is smaller than in the case of the vibration generating device 101. Thus, the magnetic fluxes that vertically pass through the right-hand part of the right-hand wire bundle 4U1R becomes more, and the magnetic flux concentration part occurs. The same applies to the left-hand part of the left-hand wire bundle 4U2L.

In view thereof, the vibration generating device 101 is configured such that the magnetic fluxes that vertically pass through the right-hand part of the right-hand wire bundle 4U1R become less by making the height H1 of the first middle magnet 5C1 lower than the height H2 of the left-hand magnet 5L; i.e., by making the gap between the first middle magnet 5C1 and the right-hand wire bundle 4U1R larger than the gap between the left-hand magnet 5L and the left-hand wire bundle 4U1L.

Specifically, in the vibration generating device 101X as illustrated in FIG. 12B, the magnetic fluxes generated from the first middle magnet 5C1 that pass through, in the up-and-down direction, a space SP1X (where faces are solid or imaginary) between the right-hand wire bundle 4U1R and the first middle magnet 5C1 are more than the magnetic fluxes generated from the left-hand magnet 5L that pass through, in the up-and-down direction, a space SP2 (where faces are solid or imaginary) between the left-hand wire bundle 4U1L and the left-hand magnet 5L. This is because the rightward-extending magnetic fluxes that pass through the right-hand side face of the space SP2 without passing through the top face of the space SP2 are more than the rightward-extending magnetic fluxes that pass through the right-hand side face of the space SP1X without passing through the top face of the space SP1X.

Meanwhile, the vibration generating device 101 as illustrated in FIG. 12A is configured such that the magnetic fluxes generated from the first middle magnet 5C1 that pass through, in the up-and-down direction, a space SP1 between the right-hand wire bundle 4U1R and the first middle magnet 5C1 are less than the magnetic fluxes generated from the left-hand magnet 5L that pass through, in the up-and-down direction, a space SP2 between the left-hand wire bundle 4U1L and the left-hand magnet 5L. In other words, the vibration generating device 101 as illustrated in FIG. 12A is configured such that the leftward-extending magnetic fluxes that pass through the left-hand side face of the space SP1 without passing through the top face of the space SP1 are more than in the case of the vibration generating device 101X.

Note that, the magnetic flux passing through the space SP1 in the up-and-down direction is a magnetic flux that passes through the bottom face of the space SP1 and the top face of the space SP1. The same applies to the magnetic flux that passes through the space SP1X in the up-and-down direction and to the magnetic flux that passes through the space SP2 in the up-and-down direction.

Also, the space SP1 is a cuboid space having the same width and the same depth as those of the right-hand wire bundle 4U1R, the space SP1X is a cuboid space having the same width and the same depth as those of the right-hand wire bundle 4U1R, and the space SP2 is a cuboid space having the same width and the same depth as those of the left-hand wire bundle 4U1L.

With this configuration, the magnetic fluxes that vertically pass through the right-hand part of the right-hand wire bundle 4U1R become less in the vibration generating device 101 than in the vibration generating device 101X, and the occurrence of the magnetic flux concentration part is suppressed. This is because the magnetic flux extending from the first middle magnet 5C1 extends so as to increase in angle from the Z axis in accordance with being farther away from the center of the top face of the first middle magnet 5C1.

The above description relates to the configuration for suppressing the formation of the magnetic flux concentration part in the right-hand part of the right-hand wire bundle 4U1R. The same applies to a configuration for suppressing the formation of the magnetic flux concentration part in the left-hand part of the left-hand wire bundle 4U2L, the right-hand part of the right-hand wire bundle 4U2R, the left-hand part of the left-hand wire bundle 4U3L, the right-hand part of the right-hand wire bundle 4D1R, the left-hand part of the left-hand wire bundle 4D2L, the right-hand part of the right-hand wire bundle 4D2R, and the left-hand part of the left-hand wire bundle 4D3L.

Figure 13A:
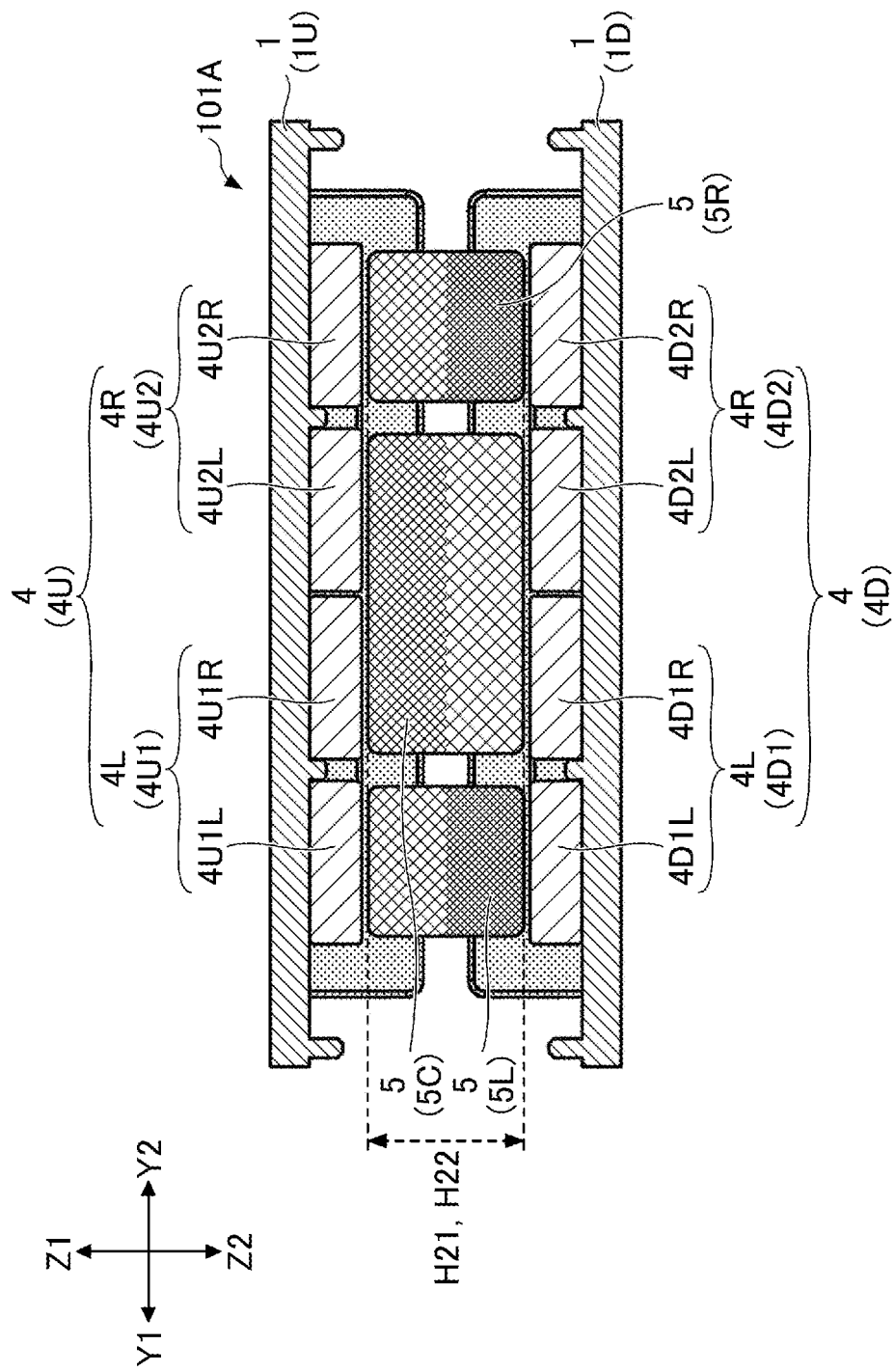
FIG. 13A is a cross-sectional view of the casing, the coil, and the magnetic flux source.
Figure 13B:
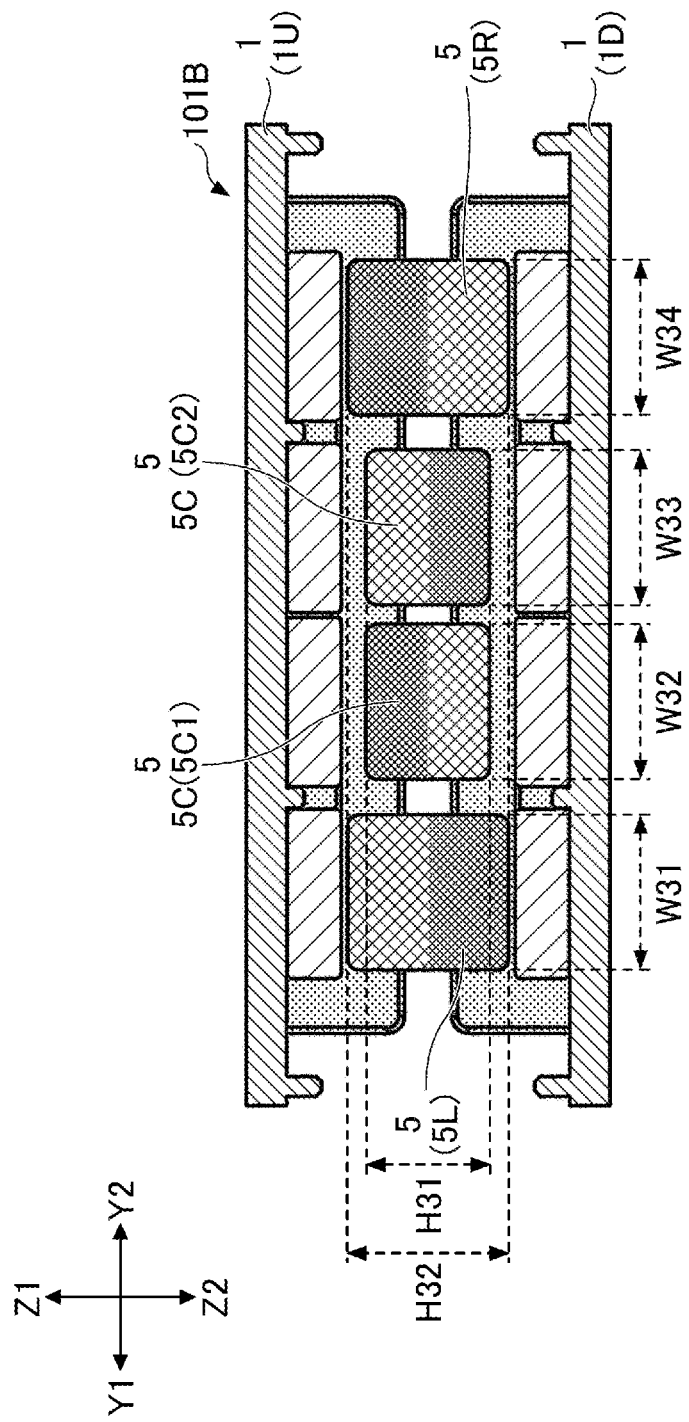
FIG. 13B is a cross-sectional view of the casing, the coil, and the magnetic flux source.
Figure 13C:
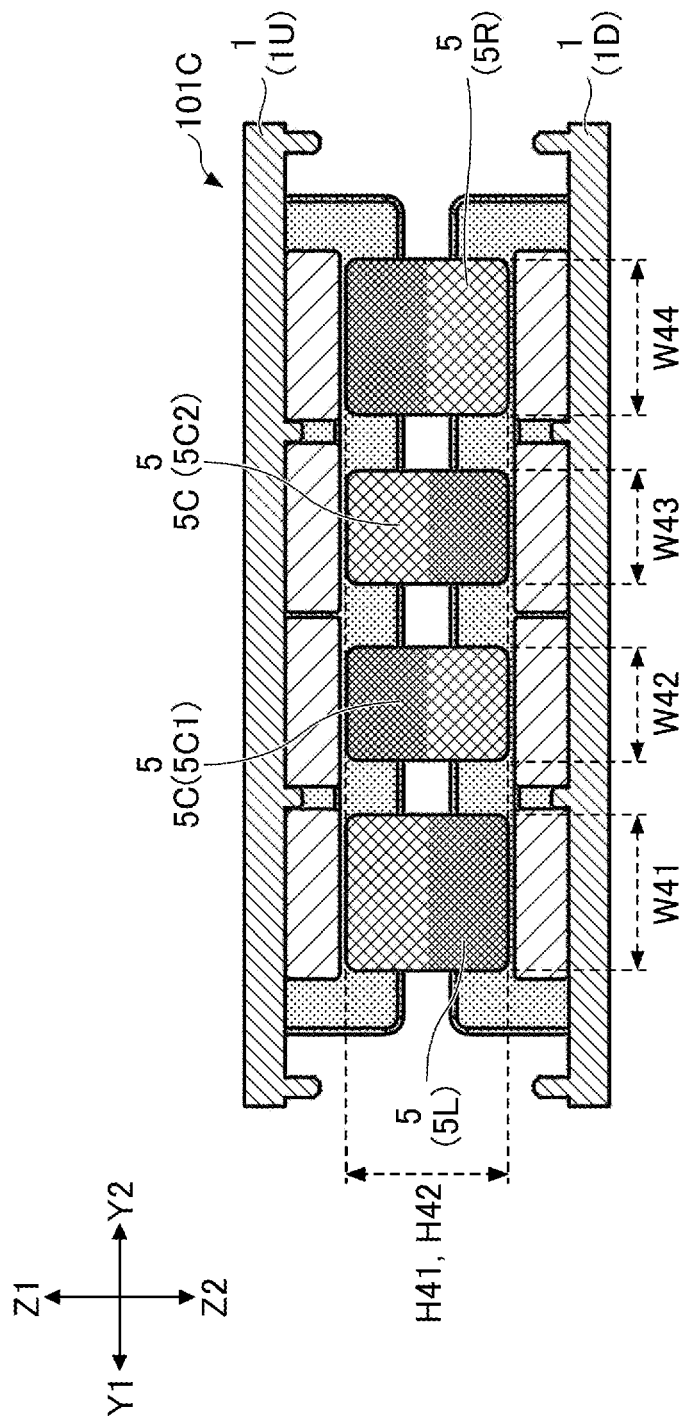
FIG. 13C is a cross-sectional view of the casing, the coil, and the magnetic flux source.

Here, referring to FIG. 13A to FIG. 13C, other configurations for suppressing the occurrence of the magnetic flux concentration part will be described. FIG. 13A to FIG. 13C, each corresponding to FIG. 9A, are cross-sectional views of the casing 1, the coil 4, and the magnetic flux source 5. Specifically, FIG. 13A is a cross-sectional view of the casing 1, the coil 4, and the magnetic flux source 5 when the movable body MB (magnetic flux source 5) is located at the center of the movable range in the vibration generating device 101A, which is another configuration example of the vibration generating device 101. FIG. 13B is a cross-sectional view of the casing 1, the coil 4, and the magnetic flux source 5 when the movable body MB (magnetic flux source 5) is located at the center of the movable range in the vibration generating device 101B, which is still another configuration example of the vibration generating device 101. FIG. 13C is a cross-sectional view of the casing 1, the coil 4, and the magnetic flux source 5 when the movable body MB (magnetic flux source 5) is located at the center of the movable range in the vibration generating device 101C, which is yet another configuration example of the vibration generating device 101.

The vibration generating device 101A as illustrated in FIG. 13A is different from the vibration generating device 101 mainly in that each of the upper coil 4U and the lower coil 4D is formed of the left-hand coil 4L and the right-hand coil 4R and the middle magnet 5C is formed of one bipolar-magnetized permanent magnet. In other words, the vibration generating device 101 is different from the vibration generating device 101A mainly in that each of the upper coil 4U and the lower coil 4D includes the middle coil 4C in addition to the left-hand coil 4L and the right-hand coil 4R and the middle magnet 5C is formed of two bipolar-magnetized permanent magnets (the first middle magnet 5C1 and the second middle magnet 5C2). Also, the vibration generating device 101A is different from the vibration generating device 101 in that a height H21 of the middle magnet 5C is the same as a height H22 of each of the left-hand magnet 5L and the right-hand magnet 5R and the magnetic force of the middle magnet 5C is weaker than the magnetic force of each of the left-hand magnet 5L and the right-hand magnet 5R. In other words, as illustrated in FIG. 11A, the vibration generating device 101 is different from the vibration generating device 101A in that the height H1 of the middle magnet 5C is lower than the height H2 of each of the left-hand magnet 5L and the right-hand magnet 5R and the magnetic force of the middle magnet 5C is the same as the magnetic force of each of the left-hand magnet 5L and the right-hand magnet 5R. Note that, in FIG. 13A, for ease of understanding, the middle magnet 5C having a weak magnetic force is given a cross pattern coarser than the cross patterns given to the left-hand magnet 5L and the right-hand magnet 5R each having a strong magnetic force.

With this configuration, the vibration generating device 101A can suppress the intensity of the magnetic field passing through the wire bundles of the coil 4 from becoming non-uniform, similar to the vibration generating device 101 utilizing the middle magnet 5C having a small thickness. Note that, in order to obtain similar effects, the vibration generating device 101A may be configured such that the left-hand magnet 5L, the middle magnet 5C, and the right-hand magnet 5R have the same magnetic force and the height H21 of the middle magnet 5C becomes lower than the height H22 of each of the left-hand magnet 5L and the right-hand magnet 5R.

The vibration generating device 101B as illustrated in FIG. 13B is different from the vibration generating device 101A mainly in that the middle magnet 5C is formed of two permanent magnets (the first middle magnet 5C1 and the second middle magnet 5C2) and a width W31 of the left-hand magnet 5L, a width W32 of the first middle magnet 5C1, a width W33 of the second middle magnet 5C2, and a width W34 of the right-hand magnet 5R are approximately the same. Also, the vibration generating device 101B is different from the vibration generating device 101A in that the left-hand magnet 5L, the first middle magnet 5C1, the second middle magnet 5C2, and the right-hand magnet 5R have approximately the same magnetic force and the height H31 of each of the first middle magnet 5C1 and the second middle magnet 5C2 is lower than the height H32 of each of the left-hand magnet 5L and the right-hand magnet 5R. However, the vibration generating device 101B and the vibration generating device 101A are common in the rest.

With this configuration, the vibration generating device 101B can suppress the intensity of the magnetic field passing through the wire bundles of the coil 4 from becoming non-uniform, similar to the vibration generating device 101A utilizing the middle magnet 5C having a weak magnetic force.

The vibration generating device 101C as illustrated in FIG. 13C is different from the vibration generating device 101B mainly in that a height H41 of each of the first middle magnet 5C1 and the second middle magnet 5C2 is approximately the same as a height H42 of each of the left-hand magnet 5L and the right-hand magnet 5R and a width W42 of the first middle magnet 5C1 and a width W43 of the second middle magnet 5C2 are smaller than a width W41 of the left-hand magnet 5L and a width W44 of the right-hand magnet 5R.

With this configuration, the vibration generating device 101C can suppress the intensity of the magnetic field passing through the wire bundles of the coil 4 from becoming non-uniform, similar to the vibration generating device 101B utilizing the middle magnet 5C having a small thickness and a large width.

As described above, by appropriately setting at least one of, for example, the width of the middle magnet 5C, the height thereof (distance between the middle magnet 5C and the coil 4), the depth thereof, and the magnetic force thereof, the vibration generating device 101 can suppress the intensity of the magnetic field passing through the wire bundles of the coil 4 from becoming non-uniform. As a result, the drive member DM formed of the coil 4 and the magnetic flux source 5 can be suppressed from decreasing in the driving force (electromagnetic force) when the movable body MB is displaced rightward or leftward. In the present embodiment, the drive member DM can output an approximately constant driving force (electromagnetic force) regardless of an amount of displacement of the movable body MB in the left-and-right direction. Meanwhile, in the vibration generating device 101X as illustrated in FIG. 11B, the driving force (electromagnetic force) of the drive member DM tends to become smaller as the amount of displacement of the movable body MB (magnetic flux source 5) becomes larger.

Note that, a plate member formed of a magnetic material may be attached to the top and bottom faces of the middle magnet 5C. This is for reducing the intensity of the magnetic field generated from the middle magnet 5C to pass through the coil 4. In this case, the left-hand magnet 5L, the middle magnet 5C, and the right-hand magnet 5R may have the same height.

With this configuration, similar to the cases of the vibration generating device 101A to the vibration generating device 101C, it is possible to suppress the intensity of the magnetic field passing through the wire bundles of the coil 4 from becoming non-uniform.

Figure 14:
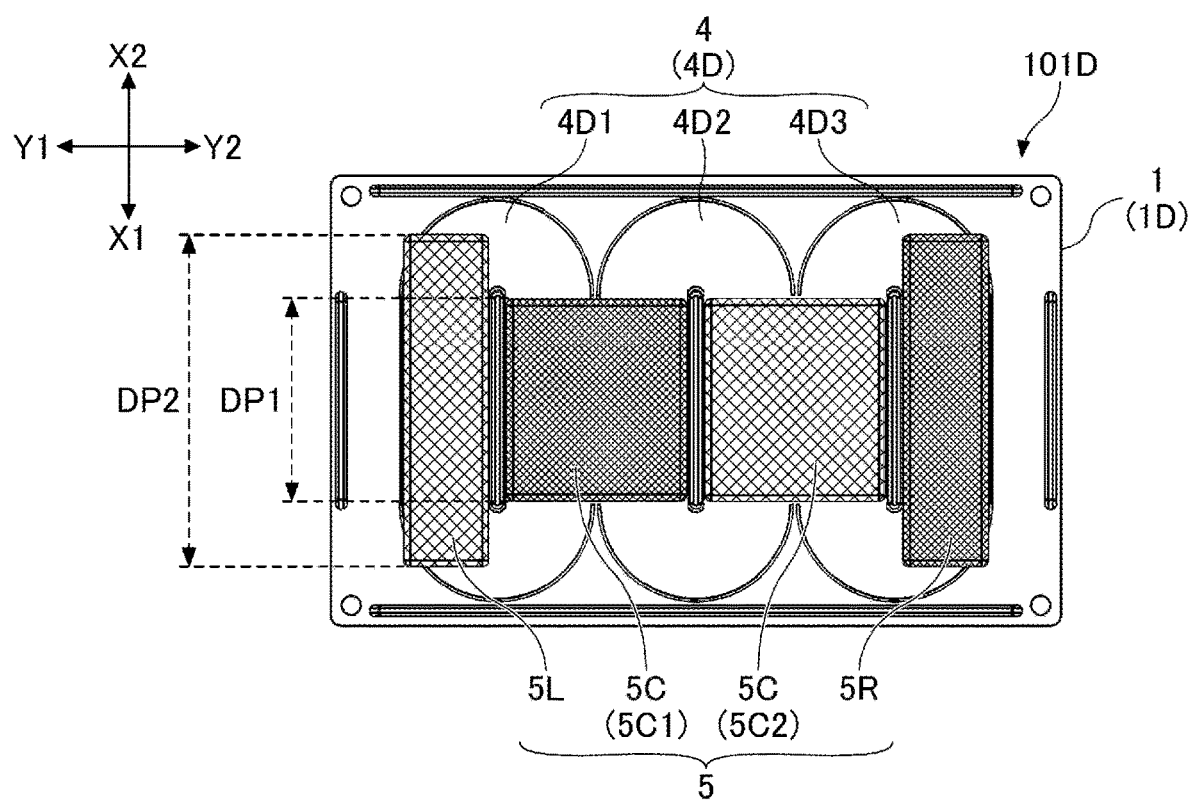
FIG. 14 is a top plan view of a lower casing, the coil, and the magnetic flux source.

Next, referring to FIG. 14, still another configuration for suppressing the occurrence of the magnetic flux concentration part will be described. FIG. 14, corresponding to FIG. 10A, is a top plan view of the casing 1, the coil 4, and the magnetic flux source 5. Specifically, FIG. 14 is a top plan view of the casing 1, the coil 4, and the magnetic flux source 5 when the movable body MB (magnetic flux source 5) is located at the center of the movable range in the vibration generating device 101D, which is another configuration example of the vibration generating device 101.

The vibration generating device 101D as illustrated in FIG. 14 is different from the vibration generating device 101 in that a depth DP1 of the middle magnet 5C is smaller than a depth DP2 of each of the left-hand magnet 5L and the right-hand magnet 5R. However, the vibration generating device 101D and the vibration generating device 101 are common in the rest.

In the example as illustrated in FIG. 14, the occurrence of the magnetic flux concentration part is suppressed by the configuration in which the depth DP1 of the middle magnet 5C (the first middle magnet 5C1 and the second middle magnet 5C2) is smaller than the depth DP2 of each of the left-hand magnet 5L and the right-hand magnet 5R.

With this configuration, the vibration generating device 101D can suppress the intensity of the magnetic field passing through the wire bundles of the coil 4 from becoming non-uniform, similar to the vibration generating device 101 utilizing the middle magnet 5C having a small thickness.

As described above, as illustrated in, for example, FIG. 2, the vibration generating device 101 according to an embodiment of the present disclosure includes: the housing HS as the stationary body including the upper casing 1U and the lower casing 1D (see FIG. 1A); the movable body MB housed in the space between the upper casing 1U and the lower casing 1D; the guide member GM that is configured to guide the movable body MB so that the movable body MB is reciprocally movable in the housing HS along the left-and-right direction; the magnetic flux source 5 fixed to one of the movable body MB and the housing HS (the movable body MB in the example as illustrated in FIG. 2); the coil 4 fixed to the other of the movable body MB and the housing HS (the housing HS in the example as illustrated in FIG. 2); and the drive member DM that is configured to provide the movable body MB with a driving force in the left-and-right direction.

As illustrated in, for example, FIG. 5A, the guide member GM includes: the upper guide 1UG that is integrally formed with the upper casing 1U and extends downward from the upper casing 1U; and the lower guide 1DG that is integrally formed with the lower casing 1D and extends upward from the lower casing 1D. Also, the guide member GM is configured such that the guided part 6G provided in the movable body MB (magnetic flux source-retaining member 6) is guided so that the guided part 6G is slidable along the left-and-right direction by the upper guide 1UG and the lower guide 1DG.

This vibration generating device 101 forms the guide member GM by utilizing a part of the upper casing 1U and a part of the lower casing 1D. Therefore, it is possible to suppress an increase in the number of parts while forming the guide member GM that is configured to guide the movable body MB so that the movable body MB is reciprocally movable in the housing HS in the left-and-right direction. Also, this configuration can suppress an increase in the size of the vibration generating device 101.

As illustrated in FIG. 5B, the guide member GM is configured such that the guided part 6G is guided in the space between the upper guide 1UG and the lower guide 1DG so that the guided part 6G is slidable along the left-and-right direction.

Specifically, as illustrated in, for example, FIG. 5A, the upper guide 1UG may include: the upper front guide 1UGF at the front side of the upper casing 1U; and the upper back guide 1UGB at the back side of the upper casing 1U. Also, the lower guide 1DG may include: the lower front guide 1DGF at the front side of the lower casing 1D; and the lower back guide 1DGB at the back side of the lower casing 1D. The guided part 6G may include the front guided part 6GF at the front side of the magnetic flux source-retaining member 6 forming the movable body MB; and the back guided part 6GB at the back side of the magnetic flux source-retaining member 6 forming the movable body MB.

More specifically, the magnetic flux source-retaining member 6 may include the projected front guided part 6GF that is formed so as to project forward from a front face thereof, so that the projected front guided part 6GF is fitted into a recessed space having a generally cuboid shape, the recessed space being formed between the tip-end part of the upper front guide 1UGF and the tip-end part of the lower front guide 1DGF. Also, the magnetic flux source-retaining member 6 may include the projected back guided part 6GB that is formed so as to project backward from a back face thereof, so that the projected back guided part 6GB is fitted into a recessed space having a generally cuboid shape, the recessed space being formed between the tip-end part of the upper back guide 1UGB and the tip-end part of the lower back guide 1DGB.

In this configuration, the guide member GM can suppress the movement of the guided part 6G in any directions other than the left-and-right direction (Y-axis direction). In other words, the guide member GM can suppress the movable body MB from moving in the front-and-back direction (X-axis direction) and in the up-and-down direction (Z-axis direction). Therefore, this configuration can simplify the shape of the elastic support member 7 that is placed between the housing HS and the movable body MB and can elastically support the movable body MB. This is because the elastic support member 7 has no need to suppress the movable body MB from moving in the front-and-back direction (X-axis direction) and in the up-and-down direction (Z-axis direction).

The housing HS may include the hollow cylindrical side casing 2 that is open at the top and bottom thereof. In this case, as illustrated in FIG. 5A and FIG. 6A, the housing HS may be configured such that the upper casing 1U is positioned so as to contact the top end of the side casing 2 from above the side casing 2 and such that the lower casing 1D is positioned so as to contact the bottom end of the side casing 2 from below the side casing 2.

This configuration makes it possible to highly precisely form a desired size of the recessed space between the tip-end part of the upper back guide 1UGB and the tip-end part of the lower back guide 1DGB. Therefore, this configuration can realize smooth sliding of the movable body MB in the left-and-right direction.

Desirably, the upper casing 1U and the lower casing 1D have the same shape and the same size. This can further reduce the number of parts forming the vibration generating device 101.

Also, as illustrated in, for example, FIG. 2, the vibration generating device 101 according to an embodiment of the present disclosure includes: the housing HS as the stationary body (see FIG. 1A); the movable body MB housed in the housing HS; the guide member GM that is configured to guide the movable body MB so that the movable body MB is reciprocally movable in the housing HS along the left-and-right direction; the magnetic flux source 5 that is fixed to one of the movable body MB and the housing HS (the movable body MB in the example as illustrated in FIG. 2) and is configured to generate the magnetic flux along the up-and-down direction; and the coil 4 that is fixed to the other of the movable body MB and the housing HS (the housing HS in the example as illustrated in FIG. 2) so as to cross the magnetic flux generated by the magnetic flux source 5 and includes electrically conductive wires extending along the front-and-back direction and being juxtaposed along the left-and-right direction.

As illustrated in, for example, FIG. 3A, the magnetic flux source 5 includes the left-hand magnet 5L, at least one of the middle magnet 5C, and the right-hand magnet 5R. The left-hand magnet 5L, the at least one of the middle magnet 5C, and the right-hand magnet 5R are juxtaposed along the left-and-right direction.

As illustrated in FIG. 9A, the coil 4 includes: the left-hand wire bundle crossing the magnetic flux from the left-hand magnet 5L; the left-hand coil 4L formed of the right-hand wire bundle crossing the magnetic flux from the middle magnet 5C; the left-hand wire bundle crossing the magnetic flux from the middle magnet 5C; and the right-hand coil 4R formed of the right-hand wire bundle crossing the magnetic flux from the right-hand magnet 5R.

The vibration generating device 101 is configured such that the magnetic fluxes generated from the middle magnet 5C that penetrate, in the up-and-down direction, a space between the right-hand wire bundle of the left-hand coil 4L and the middle magnet 5C become less than the magnetic fluxes generated from the left-hand magnet 5L that penetrate, in the up-and-down direction, a space between the left-hand wire bundle of the left-hand coil 4L and the left-hand magnet 5L, and the magnetic fluxes generated from the middle magnet 5C that penetrate, in the up-and-down direction, a space between the right-hand wire bundle of the right-hand coil 4R and the middle magnet 5C become less than the magnetic fluxes from the right-hand magnet 5R that penetrate, in the up-and-down direction, a space between the right-hand wire bundle of the right-hand coil 4R and the right-hand magnet 5R.

Desirably, the vibration generating device 101 is configured such that the magnetic fluxes passing the wire bundles forming the coil 4 become approximately uniform between the wire bundles by appropriately setting at least one of, for example, the width of the middle magnet 5C, the height thereof (distance between the middle magnet 5C and the coil 4), the depth thereof, and the magnetic force thereof.

This configuration can suppress the intensity of the magnetic field passing through the coil 4 from becoming non-uniform from position to position regardless of a relative positional relationship between the coil 4 and the magnetic flux source 5. Specifically, this configuration can suppress the magnetic fluxes passing through the wire bundles of the coil 4 from becoming non-uniform between the wire bundles. Therefore, this configuration can suppress, when the movable body MB moves in the left-and-right direction, hindrance of the movement toward a desired direction due to an induced electromotive force generated through electromagnetic induction as a result of change in the intensity of the magnetic field passing through the specific wire bundles in the coil 4. This means that as compared with a configuration as illustrated in FIG. 11B in which the intensity of the magnetic field passing through the coil 4 is not uniform from position to position, the vibration generating device 101 can realize a larger driving force with the same power consumption or can reduce the power consumption for realizing the same driving force.

For example, as illustrated in FIG. 11A, the magnetic flux source 5 may be configured such that a thickness of the middle magnet 5C in the up-and-down direction becomes smaller than a thickness of the left-hand magnet 5L in the up-and-down direction and a thickness of the right-hand magnet 5R in the up-and-down direction. This is for suppressing the intensity of the magnetic field passing through the wire bundles of the coil 4 from becoming non-uniform from position to position by reducing the magnetic fluxes generated by the middle magnet 5C of the magnetic fluxes passing through the wire bundles of the coil 4.

This configuration can more reliably suppress the intensity of the magnetic field passing through the coil 4 from becoming non-uniform from position to position as compared with the case as illustrated in FIG. 13C in which the magnetic flux source 5 is configured such that the width of the middle magnet 5C in the left-and-right direction becomes smaller than the width of each of the left-hand magnet 5L and the right-hand magnet 5R in the left-and-right direction. In this configuration, the width of each of the left-hand magnet 5L, the middle magnet 5C, and the right-hand magnet 5R in the left-and-right direction can be made consistent with the width of the wire bundle of the coil 4 in the left-and-right direction.

Also, as illustrated in FIG. 13A, the magnetic flux source 5 may be configured such that the middle magnet 5C has a width dimension in the left-and-right direction that is approximately twice that of the left-hand magnet 5L in the left-and-right direction, and is configured to generate the magnetic flux toward the right-hand wire bundle of the left-hand coil 4L and the left-hand wire bundle of the coil next to and rightward of the left-hand coil 4L (right-hand coil 4R).

This configuration can reduce the number of parts forming the vibration generating device 101 as compared with the case as illustrated in FIG. 13B in which the middle magnet 5C is formed of two magnets arranged side by side each having the same left-right width as the left-hand coil 4L.

The embodiments of the present disclosure have been described above in detail. However, the present disclosure should not be construed as being limited to the above-described embodiments. Various modifications, substitutions, and the like. can be applied to the above-described embodiments without departing from the scope of the present disclosure. The features described with reference to the above-described embodiments may be appropriately combined together unless there is any technical contradiction.

For example, in the above-described embodiments, the lower casing 1D, the upper casing 1U, and the side casing 2 are formed as mutually independent individual members. However, the side casing 2 may be integrally formed with the lower casing 1D or the upper casing 1U. For example, the upper casing 1U and the side casing 2 may be integrally formed as a single part.

Also, the upper guide 1UG and the lower guide 1DG may be formed so as to face the second side plate 2A2 and the fourth side plate 2A4, respectively. In this case, the guided part 6G may be formed at the left-hand end and the right-hand end of the movable body MB. For example, the guided part 6G may be a combination of a rod member projecting leftward from the left-hand end of the magnetic flux source-retaining member 6 and a rod member projecting rightward from the right-hand end of the magnetic flux source-retaining member 6. In this case, the guide member GM may be configured such that the upper guide 1UG includes an upper right guide and an upper left guide, and the lower guide 1DG includes a lower right guide and a lower left guide. The rod member projecting leftward from the left-hand end of the magnetic flux source-retaining member 6 may be supported between the tip-end part of the upper left guide and the tip-end part of the lower left guide such that the rod member is slidable therebetween. The rod member projecting rightward from the right-hand end of the magnetic flux source-retaining member 6 may be supported between the tip-end part of the upper right guide and the tip-end part of the lower right guide such that the rod member is slidable therebetween. Alternatively, the rod member projecting leftward from the left-hand end of the magnetic flux source-retaining member 6 may be inserted into a guide hole that is formed in the upper left guide, the lower left guide, or both. The rod member projecting rightward from the right-hand end of the magnetic flux source-retaining member 6 may be inserted into a guide hole that is formed in the upper right guide, the lower right guide, or both.

Also, in the above-described embodiments, the magnetic flux source-retaining member 6 includes the projected front guided part 6GF that is formed so as to project forward from a front face thereof, so that the projected front guided part 6GF is fitted into a recessed space having a generally cuboid shape, the recessed space being formed between the tip-end part of the upper front guide 1UGF and the tip-end part of the lower front guide 1DGF. Also, the magnetic flux source-retaining member 6 includes the projected back guided part 6GB that is formed so as to project backward from a back face thereof, so that the projected back guided part 6GB is fitted into a recessed space having a generally cuboid shape, the recessed space being formed between the tip-end part of the upper back guide 1UGB and the tip-end part of the lower back guide 1DGB. However, the magnetic flux source-retaining member 6 may include a recessed guided part instead of the projected guided part 6G. For example, the magnetic flux source-retaining member 6 may include a recessed front guided part instead of the projected front guided part 6GF. In this case, the tip-end part of each of the upper front guide 1UGF and the lower front guide 1DGF may be formed so as to be folded inside and engaged with the recessed front guided part. The same applies to the back guided part 6GB.

Also, in the above-described embodiments, the vibration generating device 101 is configured such that the coil 4 is attached to the housing HS as the stationary body and the magnetic flux source 5 is attached to the movable body MB. In other words, the vibration generating device 101 is configured as a moving magnet-type vibration generating device. However, the vibration generating device 101 may be configured such that the coil 4 is attached to the movable body MB and the magnetic flux source 5 is attached to the housing HS. In other words, the vibration generating device 101 may be configured as a moving coil-type vibration generating device.

Also, in the above-described embodiments, the vibration generating device 101 is configured such that the coil axis of the coil 4 is vertical to a direction in which the magnetic flux source 5 moves. However, the vibration generating device 101 may be configured such that the coil axis of the coil 4 is parallel to the direction in which the magnetic flux source 5 moves.

Also, in the above-described embodiments, the coil 4 includes: the upper coil 4U that is fixed to the lower face of the upper casing 1U; and the lower coil 4D that is fixed to the upper face of the lower casing 1D. However, any one of the upper coil 4U and the lower coil 4D may be omitted.

The above-described vibration generating device can suppress the reduction in the driving force due to the change in the intensity of the magnetic field that passes through the coil.

What is claimed is:

1. A vibration generating device, comprising:
   a stationary body;
   a movable body housed in the stationary body;
   a guide member that is configured to guide the movable body so that the movable body is reciprocally movable in the stationary body along a left-and-right direction;
   a magnetic flux source that is fixed to one of the movable body and the stationary body and configured to generate a magnetic flux along an up-and-down direction; and
   a coil that is fixed to the other of the movable body and the stationary body so as to cross the magnetic flux generated by the magnetic flux source and includes electrically conductive wires extending along a front-and-back direction and being juxtaposed along the left-and-right direction,
   the magnetic flux source including a left-hand magnet, at least one middle magnet, and a right-hand magnet,
   the left-hand magnet, the at least one middle magnet, and the right-hand magnet being juxtaposed along the left-and-right direction,
   the coil including
      a left-hand coil including a left-hand wire bundle that is to cross the magnetic flux from the left-hand magnet and a right-hand wire bundle that is to cross the magnetic flux from the at least one middle magnet; and
      a right-hand coil including a left-hand wire bundle that is to cross the magnetic flux from the at least one middle magnet and a right-hand wire bundle that is to cross the magnetic flux from the right-hand magnet,
   wherein magnetic fluxes generated from the at least one middle magnet that pass through, in the up-and-down direction, a space between the right-hand wire bundle of the left-hand coil and the at least one middle magnet are less than magnetic fluxes generated from the left-hand magnet that pass through, in the up-and-down direction, a space between the left-hand wire bundle of the left-hand coil and the left-hand magnet, and
   magnetic fluxes generated from the at least one middle magnet that pass through, in the up-and-down direction, a space between the left-hand wire bundle of the right-hand coil and the at least one middle magnet are less than magnetic fluxes generated from the right-hand magnet that pass through, in the up-and-down direction, a space between the right-hand wire bundle of the right-hand coil and the right-hand magnet.

2. The vibration generating device according to claim 1, wherein the at least one middle magnet has a width dimension in the left-and-right direction that is approximately twice a width dimension of the left-hand magnet in the left-and-right direction, and the at least one middle magnet is configured to generate the magnetic flux toward the right-hand wire bundle of the left-hand coil and the left-hand wire bundle of the coil next to and rightward of the left-hand coil.

3. The vibration generating device according to claim 1, wherein a thickness of the at least one middle magnet in the up-and-down direction is smaller than a thickness of the left-hand magnet in the up-and-down direction and smaller than a thickness of the right-hand magnet in the up-and-down direction.

4. The vibration generating device according to claim 3, wherein the at least one middle magnet has a width dimension in the left-and-right direction that is approximately twice a width dimension of the left-hand magnet in the left-and-right direction, and the at least one middle magnet is configured to generate the magnetic flux toward the right-hand wire bundle of the left-hand coil and the left-hand wire bundle of the coil next to and rightward of the left-hand coil.

* * * * *